(12) United States Patent
Peruch et al.

(10) Patent No.: US 11,341,350 B2
(45) Date of Patent: May 24, 2022

(54) SYSTEMS AND METHODS FOR VOLUMETRIC SIZING

(71) Applicant: PACKSIZE LLC, Salt Lake City, UT (US)

(72) Inventors: Francesco Peruch, Sunnyvale, CA (US); Giuliano Pasqualotto, Mountain View, CA (US); Giridhar Murali, Sunnyvale, CA (US); Ethan Cheng, Cupertino, CA (US); Kinh Tieu, Sunnyvale, CA (US)

(73) Assignee: Packsize LLC, Salt Lake City, UT (US)

( * ) Notice: Subject to any disclaimer, the term of this patent is extended or adjusted under 35 U.S.C. 154(b) by 2 days.

(21) Appl. No.: 16/240,691

(22) Filed: Jan. 4, 2019

(65) Prior Publication Data

US 2019/0213389 A1 Jul. 11, 2019

Related U.S. Application Data

(60) Provisional application No. 62/613,957, filed on Jan. 5, 2018.

(51) Int. Cl.
| | |
|---|---|
| *G06K 9/00* | (2006.01) |
| *G06K 9/62* | (2022.01) |
| *G06T 7/10* | (2017.01) |
| *G06T 7/50* | (2017.01) |

(Continued)

(52) U.S. Cl.
CPC ....... *G06K 9/00201* (2013.01); *G06K 9/6202* (2013.01); *G06T 7/10* (2017.01);
(Continued)

(58) Field of Classification Search
CPC .... G06K 9/00201; G06K 9/6202; G06T 7/12; G06T 7/50; G06T 7/187; G06T 7/62; G06T 7/10; G06T 7/11; G06T 2207/10028
See application file for complete search history.

(56) References Cited

U.S. PATENT DOCUMENTS

| | | |
|---|---|---|
| 9,392,262 B2 | 7/2016 | Dal Mutto et al. |
| 9,516,295 B2 | 12/2016 | Dal Mutto et al. |

(Continued)

FOREIGN PATENT DOCUMENTS

WO 2019/136315 A2 7/2019

OTHER PUBLICATIONS

Gottschalk, S. et al., OBBTree: A Hierarchical Structure for Rapid Interference Detection, *Proceedings of the 23rd annual conference on Computer graphics and interactive techniques*, 1996, pp. 171-180, Association for Computing Machinery, New York, New York.

(Continued)

*Primary Examiner* — Syed Haider
(74) *Attorney, Agent, or Firm* — Workman Nydegger

(57) ABSTRACT

A method for computing dimensions of an object in a scene includes: controlling, by a processor, a depth camera system to capture at least a frame of the scene, the frame including a color image and a depth image arranged in a plurality of pixels; detecting, by the processor, an object in the frame; determining, by the processor, a ground plane in the frame, the object resting on the ground plane; computing, by the processor, a rectangular outline bounding a projection of a plurality of pixels of the object onto the ground plane; computing, by the processor, a height of the object above the ground plane; and outputting, by the processor, computed dimensions of the object in accordance with a length and a width of the rectangular outline and the height.

26 Claims, 13 Drawing Sheets

(2 of 13 Drawing Sheet(s) Filed in Color)

(51) Int. Cl.
*G06T 7/187* (2017.01)
*G06T 7/11* (2017.01)
*G06T 7/62* (2017.01)
*G06T 7/12* (2017.01)

(52) U.S. Cl.
CPC .................. *G06T 7/11* (2017.01); *G06T 7/12* (2017.01); *G06T 7/187* (2017.01); *G06T 7/50* (2017.01); *G06T 7/62* (2017.01); *G06T 2207/10028* (2013.01)

(56) References Cited

U.S. PATENT DOCUMENTS

| | | | |
|---|---|---|---|
| 9,826,216 | B1 | 11/2017 | Hazeghi et al. |
| 2003/0053671 | A1* | 3/2003 | Dewaele .................. G06T 7/12 382/132 |
| 2013/0100286 | A1 | 4/2013 | Lao |
| 2014/0104416 | A1* | 4/2014 | Giordano ................. G01N 9/02 348/135 |
| 2014/0159925 | A1 | 6/2014 | Mimeault et al. |
| 2015/0294511 | A1 | 10/2015 | Nishioka et al. |
| 2016/0196659 | A1* | 7/2016 | Vrcelj ....................... G06T 7/12 382/154 |
| 2017/0251143 | A1 | 8/2017 | Peruch et al. |
| 2017/0272727 | A1* | 9/2017 | Jiang .................... H04N 13/271 |
| 2018/0231371 | A1* | 8/2018 | Galin ........................ G06T 7/62 |
| 2018/0283848 | A1* | 10/2018 | Bordenave ............. G01B 11/00 |

OTHER PUBLICATIONS

Huebner, Kai et al., Minimum Volume Bounding Box Decomposition for Shape Approximation in Robot Grasping, *IEEE International Conference on Robotics and Automation*, 2008, pp. 1628-1633, IEEE, New York, New York.

Jia, Zhaoyin et al., 3D-Based Reasoning with Blocks, Support, and Stability, *Proceedings of the IEEE Conference on Computer Vision and Pattern Recognition*, 2013, pp. 1-8, IEEE, New York, New York.

O'Rourke, Joseph, Finding Minimal Enclosing Boxes, Reprinted from International Journal of Computer and Information Sciences, 1985, pp. 183-199, vol. 14, No. 3, Pienum Publishing Corporation, Belgium.

Toussaint, Godfried, Solving Geometric Problems with the Rotating Calipers, *Proceedings of IEEE MELECON'83*, May 1983, pp. 1-8, Athens, Greece.

Agarwal, Pankaj et al., Geometric Approximation via Coresets, *Combinatorial and computational geometry*, 2005, pp. 1-30, vol. 52, MSRI Publications, Berkeley, California.

Barequet, Gill et al., Efficiently Approximating the Minimum-Volume Bouding Box of a Point Set in Three Dimensions, Journal of Algorithms, Jun. 30, 2001, pp. 1-17, 38(1), Elsevier, Amsterdam, Netherlands.

Chang, Chia-Tche et al., Fast oriented bounding box optimization on the rotation group *SO* (3, R), ACM Transactions on Graphics, 2011, pp. 1-17, vol. 30, No. 5, Article 122, Association for Computing Machinery, New York, New York.

International Search Report and Written Opinion for International Application No. PCT/US19/12434, dated Apr. 19, 2019, 12 pages.

Szeliski, R., "Computer Vision: Algorithms and Applications", Springer, 2010 pp. 467-503.

\* cited by examiner

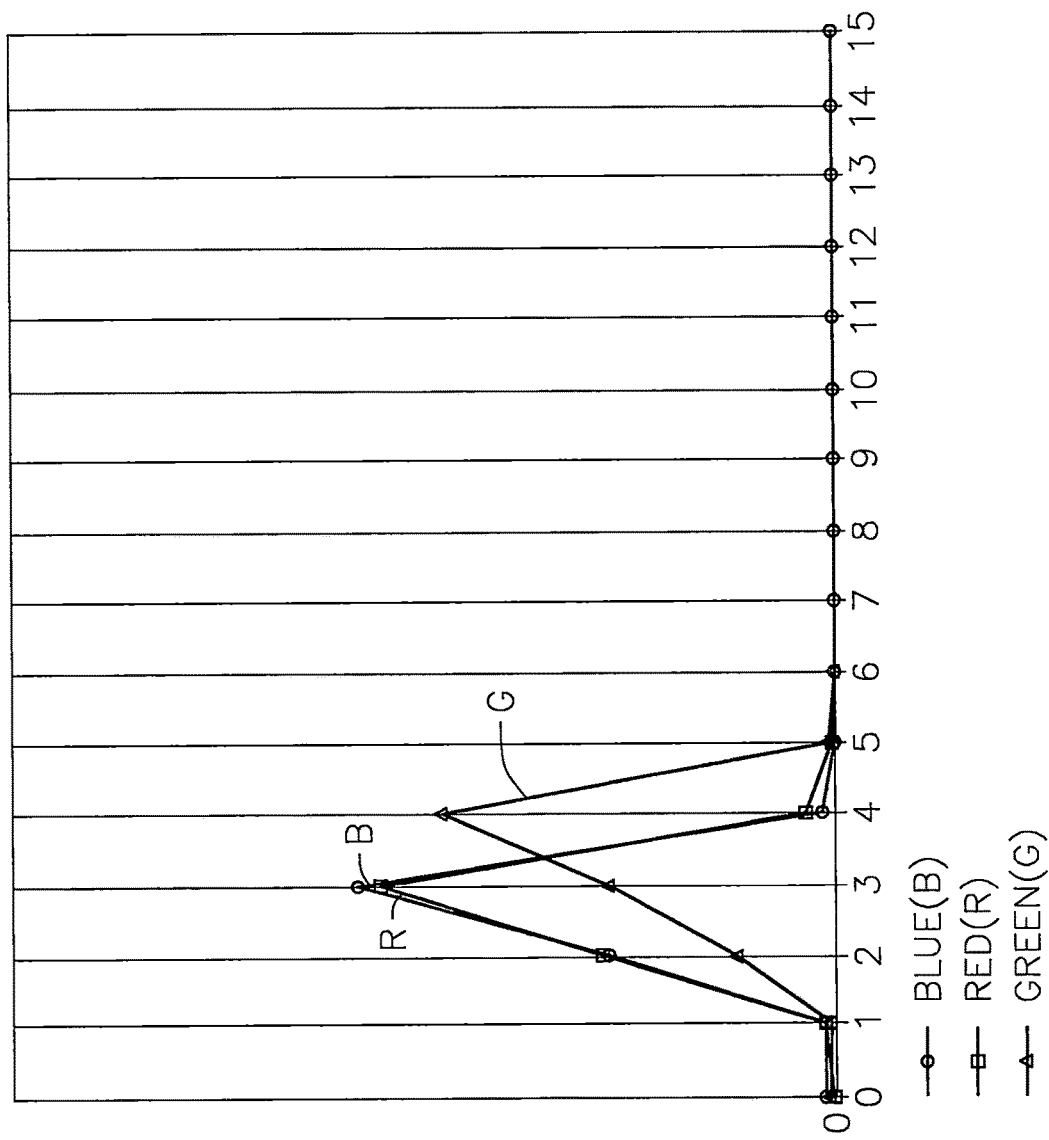

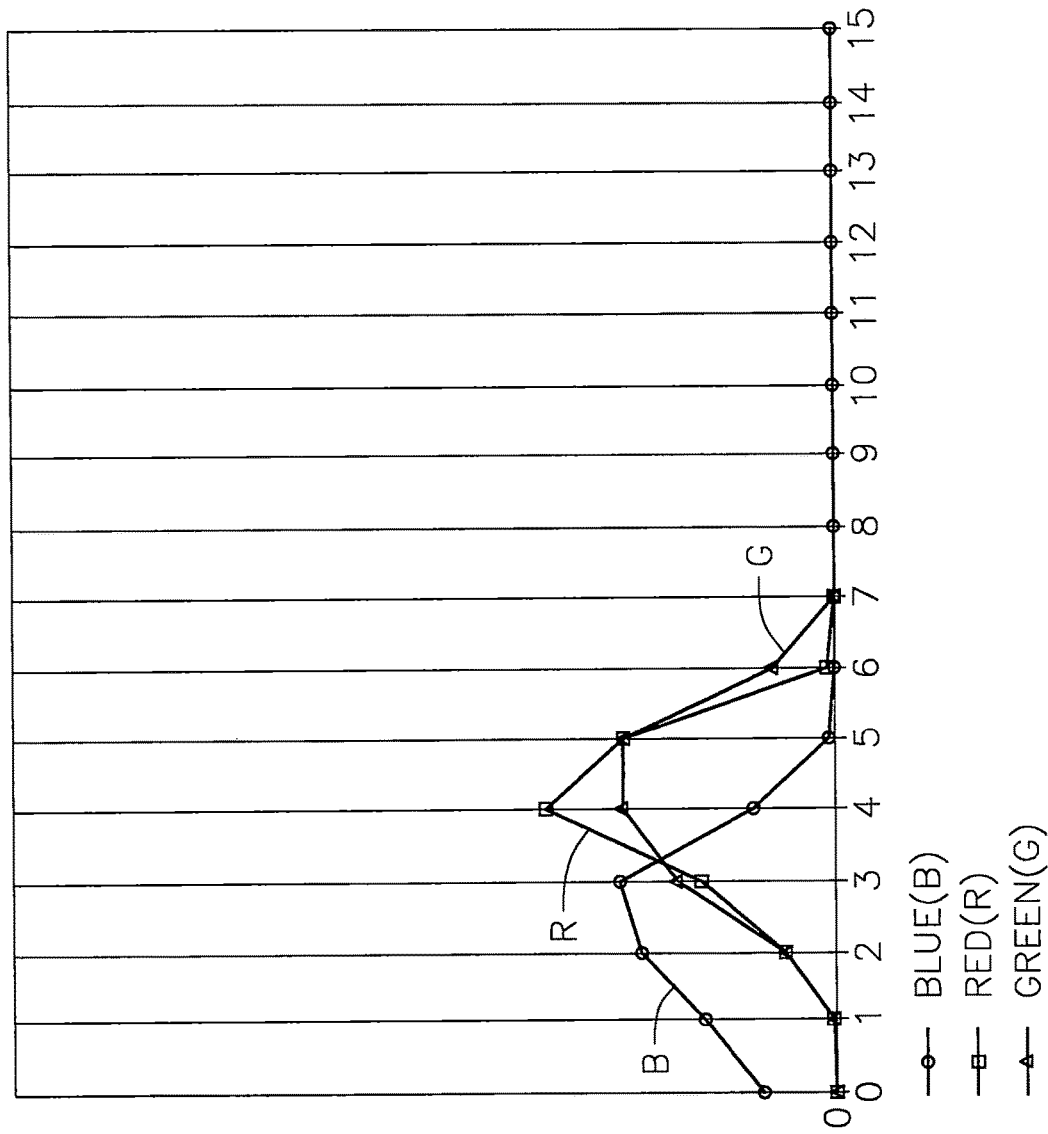

SYSTEMS AND METHODS FOR VOLUMETRIC SIZING

CROSS-REFERENCE TO RELATED APPLICATION(S)

This application claims the benefit of U.S. Provisional Patent Application No. 62/613,957, filed in the United States Patent and Trademark Office on Jan. 5, 2018, the entire disclosure of which is incorporated by reference herein.

FIELD

Aspects of embodiments of the present invention relate to systems and methods for estimating physical dimensions of objects.

BACKGROUND

Measuring or estimating the dimensions of objects, including the volumes of objects, is a common task in fields such as resource planning and logistics. For example, when loading boxes into one or more trucks, estimates of the sizes and shapes of the boxes can help in the efficient distribution of the boxes among the different trucks to reduce or minimize empty space in the trucks. As another example, freight or shipping companies may bill their customers in accordance with the dimensions (and mass or weight) of the packages to be shipped.

As another example, mail order retailers may be interested in identifying the correctly sized box for shipping various retail goods. While many of these goods may be cuboidal in shape (e.g., because they are sold in boxes), many other goods (such as a bottle of laundry detergent or a gardening trowel) may have irregular shapes. To reduce shipping costs, these mail order retailers may desire to find the minimal sized box that will contain the items to be shipped as part of a particular customer's order.

SUMMARY

Aspects of embodiments of the present invention relate to systems and methods for automatically estimating the dimensions of an object, including the volume of an object.

According to one embodiment of the present invention, a system includes: a depth camera system configured to capture color information and depth information of a scene; a processor configured to control the depth camera system; a memory storing instructions that, when executed by the processor, cause the processor to: control the depth camera system to capture at least a frame of the scene, the frame including a color image and a depth image arranged in a plurality of pixels; detect an object in the frame; determine a ground plane in the frame, the object resting on the ground plane; compute a rectangular outline bounding a projection of a plurality of pixels of the object onto the ground plane; compute a height of the object above the ground plane; and output computed dimensions of the object in accordance with a length and a width of the rectangular outline and the height.

The memory may further store instructions that, when executed by the processor, cause the processor to segment the object from the scene by: identifying one or more initial pixels of the object; and performing an iterative flood fill operation, starting with the initial points of the object, each iteration of the flood fill operation including adding a plurality of neighboring pixels of the frame to the pixels of the object when distances between the neighboring pixels and the pixels of the object are within a threshold distance.

The system may further include a display device coupled to the processor, wherein the memory may further include instructions that, when executed by the processer, cause the processor to: control the display device to display a view of the color image of the scene captured by the depth camera; and overlay a reticle on the view in the display device, and wherein the one or more initial pixels of the object may correspond to the pixels under the reticle.

The system may further include a trigger, wherein the processor may be configured to control the depth camera system to capture the frame in response to detecting an activation of the trigger, and wherein the one or more initial pixels of the object may correspond to the pixels under the reticle when the trigger is activated.

The memory may further store instructions that, when executed by the processor, cause the processor to segment the object from the scene by: defining a graph, wherein each vertex of the graph corresponds to a vertical projection of the pixels of the scene onto the ground plane and wherein two vertices are connected by an edge if their distance is smaller than threshold; detecting connected components of the vertical projection of the pixels; and identifying the largest connected component of the graph as the pixels of the object.

The system may further include a display device coupled to the processor, wherein the instructions configured to output the computed dimensions may include instructions to display the computed dimensions on the display device.

The system may further include an inertial measurement unit rigidly connected to the depth camera system and configured to detect an orientation of the depth camera system, wherein the memory may further include instructions that, when executed by the processer, cause the processor to determine the ground plane by: identifying, when capturing the frame, an orientation of the depth camera system based on data from the inertial measurement unit; identifying a plurality of bottom pixels of the frame based on the orientation; computing a partial plane from the bottom pixels of the frame; and extending the partial plane in the depth image to define the ground plane.

A width of a strip of the bottom pixels is calculated in accordance with noise characteristics of the depth camera system.

The memory may further store instructions that, when executed by the processor, cause the processor to further determine the computed dimensions in accordance with a box mode, the object including two vertical faces, the instructions corresponding to the box mode including instructions that, when executed by the processor, cause the processor to: identify a corner of the object, wherein the corner of the object is located at an intersection of two lines formed in the projection of the pixels of the vertical faces of the object onto the ground plane; compute the height of the object above the ground plane by computing heights of top edges of the two vertical faces; and compute dimensions of vertical planes of the object.

The memory may further store instructions that, when executed by the processor, cause the processor to compute the heights of the top edges of the two vertical faces by: dividing the ground plane into a plurality of cells; selecting a plurality of cells including the lines; computing a maximum height of each cell based on the pixels of the object in each of the cells; and computing a height of the box based on the maximum heights of the cells.

The memory may further store instructions that, when executed by the processor, cause the processor to activate or deactivate the box mode based on a user interface switch.

The memory may further store instructions that, when executed by the processor, cause the processor to activate the box mode in response to detecting that the object includes two vertical planes arranged at right angles to the ground plane and at right angles to each other.

The depth camera system may include: a color camera; a plurality of infrared cameras; and an infrared illuminator configured to emit light in a wavelength interval that is detectable by the plurality of infrared cameras.

The memory may store instructions that, when executed by the processor, cause the processor to capture the frame of the scene by: controlling the color camera and the plurality of infrared cameras to concurrently capture images while controlling the infrared illuminator to emit light; computing a disparity map from the images captured by the infrared cameras; calculating the depth image of the frame from the disparity map; and mapping the image captured by the color camera onto the disparity map as the color image of the frame, wherein the images are captured from substantially the same pose with respect to the scene.

The color camera, the infrared cameras, and the infrared illuminator may be fixed on a stationary frame, and the color camera and the infrared cameras may have fields of view directed a scale.

The color camera, the infrared cameras, and the infrared illuminator may be mounted on a handheld scanning device.

The computed dimensions of the object may correspond to dimensions of a box tightly fitting the object.

According to one embodiment of the present invention, a method for computing dimensions of an object in a scene includes: controlling, by a processor, a depth camera system to capture at least a frame of the scene, the frame including a color image and a depth image arranged in a plurality of pixels; detecting, by the processor, an object in the frame; determining, by the processor, a ground plane in the frame, the object resting on the ground plane; computing, by the processor, a rectangular outline bounding a projection of a plurality of pixels of the object onto the ground plane; computing, by the processor, a height of the object above the ground plane; and outputting, by the processor, computed dimensions of the object in accordance with a length and a width of the rectangular outline and the height.

The method may further include segmenting the object from the scene by: identifying one or more initial pixels of the object; and performing an iterative flood fill operation, starting with the initial points of the object, each iteration of the flood fill operation including adding a plurality of neighboring pixels of the frame to the pixels of the object when distances between the neighboring pixels and the pixels of the object are within a threshold distance.

The method may further include: controlling a display device coupled to the processor to display a view of the color image of the scene captured by the depth camera; and overlaying a reticle on the view in the display device, and wherein the one or more initial pixels of the object correspond to the pixels under the reticle.

The method may further include controlling the depth camera system to capture the frame in response to detecting an activation of a trigger coupled to the processor, and wherein the one or more initial pixels of the object correspond to the pixels under the reticle when the trigger is activated.

The method may further include segmenting the object from the scene by: defining a graph, wherein each vertex of the graph corresponds to a vertical projection of the pixels of the scene onto the ground plane and wherein two vertices are connected by an edge if their distance is smaller than threshold; detecting connected components of the vertical projection of the pixels; and identifying the largest connected component of the graph as the pixels of the object.

The method may further include displaying the computed dimensions on a display device coupled to the processor.

The method may further include determining the ground plane by: identifying, when capturing the frame, an orientation of the depth camera system based on data from an inertial measurement unit rigidly connected to the depth camera system; identifying a plurality of bottom pixels of the frame based on the orientation; computing a partial plane from the bottom pixels of the frame; and extending the partial plane in the depth image to define the ground plane.

A width of a strip of the bottom pixels may be calculated in accordance with noise characteristics of the depth camera system.

The method may further include determining the computed dimensions in accordance with a box mode, the object including two vertical faces, by: identifying a corner of the object, wherein the corner of the object is located at an intersection of two lines formed in the projection of the pixels of the vertical faces of the object onto the ground plane; computing the height of the object above the ground plane by computing heights of top edges of the two vertical faces; and computing dimensions of vertical planes of the object.

The method may further include computing the heights of the top edges of the two vertical faces by: dividing the ground plane into a plurality of cells; selecting a plurality of cells including the lines; computing a maximum height of each cell based on the pixels of the object in each of the cells; and computing a height of the box based on the maximum heights of the cells.

The method may further include activating or deactivating the box mode based on a user interface switch.

The method may further include activating the box mode in response to detecting that the object includes two vertical planes arranged at right angles to the ground plane and at right angles to each other.

The depth camera system may include: a color camera; a plurality of infrared cameras; and an infrared illuminator configured to emit light in a wavelength interval that is detectable by the plurality of infrared cameras.

The method may further include: controlling the color camera and the plurality of infrared cameras to concurrently capture images while controlling the infrared illuminator to emit light; computing a disparity map from the images captured by the infrared cameras; calculating the depth image of the frame from the disparity map; and mapping the image captured by the color camera onto the disparity map as the color image of the frame, wherein the images are captured from substantially the same pose with respect to the scene.

The color camera, the infrared cameras, and the infrared illuminator may be fixed on a stationary frame, and the color camera and the infrared cameras may have fields of view directed a scale.

The color camera, the infrared cameras, and the infrared illuminator may be mounted on a handheld scanning device.

The computed dimensions of the object may correspond to dimensions of a box tightly fitting the object.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, together with the specification, illustrate exemplary embodiments of the present invention, and, together with the description, serve to explain the principles of the present invention.

FIGS. 8A, 8B, and 8C are histograms of colors computed from the RGB image for possible candidates of vertical sides extents (thin green lines of FIG. 7D) according to one embodiment of the present invention.

DETAILED DESCRIPTION

Figure 1A:
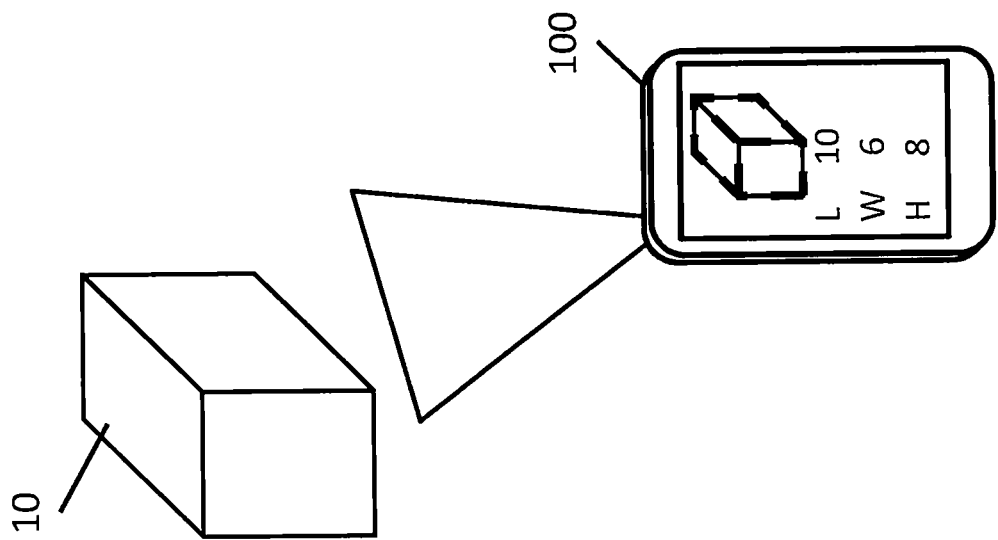
FIG. 1A is a schematic depiction of the measurement of an object a system according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Aspects of embodiments of the present invention relate to systems and methods for automatically estimating physical dimensions of objects in a scene. Some aspects of embodiments of the present invention relate to "contactless" measurements of physical objects, wherein a depth camera captures one or more depth images of an object and the dimensions of an object (e.g., length, width, height, and volume), or a bounding box thereof are estimated from the one or more depth images.

FIG. 1A is a schematic depiction of the measurement of an object a system according to one embodiment of the present invention. As shown in FIG. 1A, a depth camera system 100 captures images of an object 10. The object 10 may be, for example, a substantially cuboidal object (e.g., a rectangular cardboard box), as shown in FIG. 1, or may have a more arbitrary shape (e.g., a bottle of laundry detergent or a gardening trowel). As shown in FIG. 1A, in some embodiments of the present invention, the depth camera system 100 may include a display device 122 for displaying the measurements captured by the depth camera system 100. In other embodiments of the present invention, the display device 122 may be physically separate from the cameras of the depth camera system 100, such as in the case of a separate reporting or monitoring system.

Figure 1B:
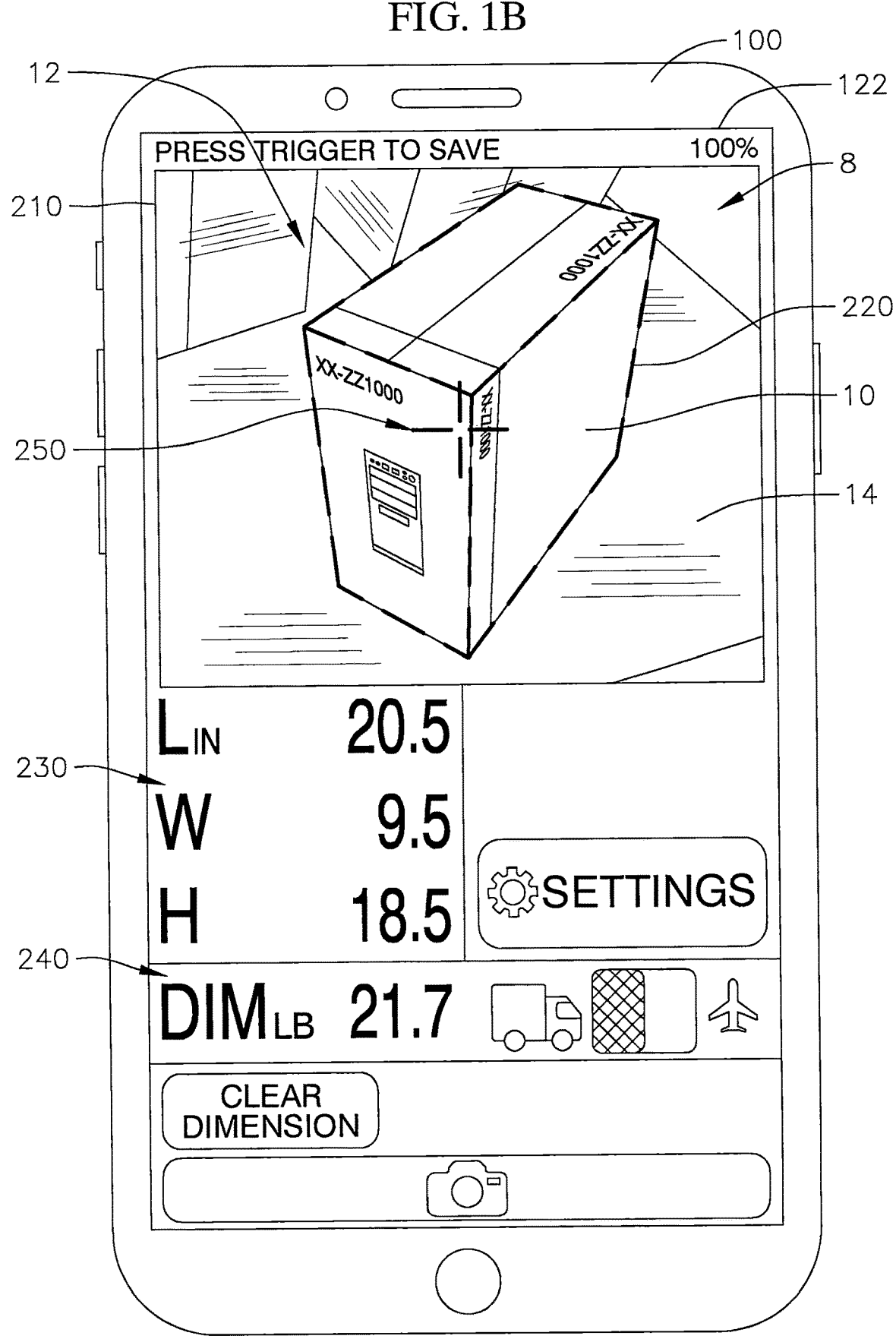
FIGS. 1B and 1C are schematic depictions of user interfaces of a system according to one embodiment of the present invention when measuring the dimensions of a box-like object (FIG. 1B) and a non-box-like (or arbitrary) object (FIG. 2B).
Figure 1C:
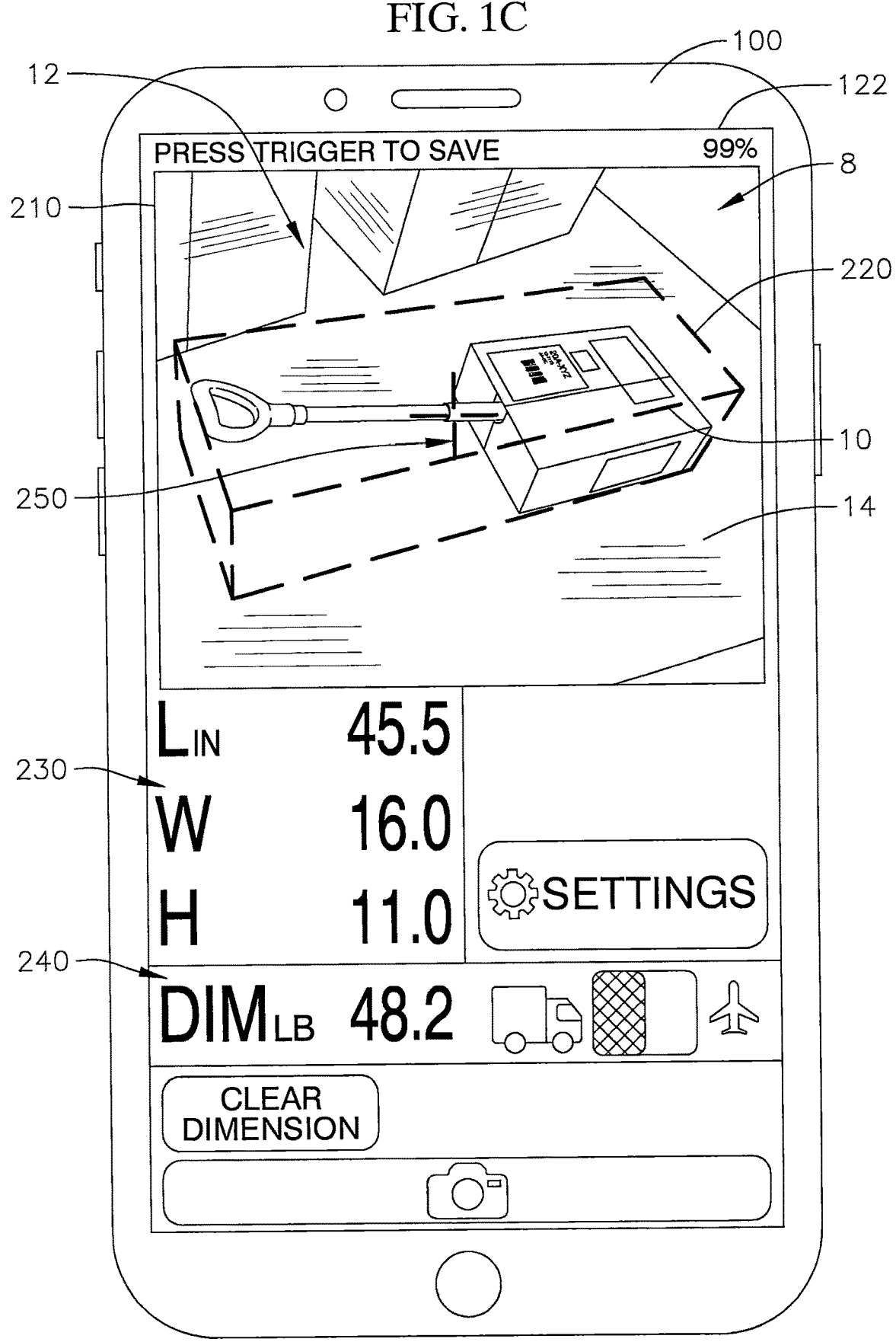

FIGS. 1B and 1C are schematic depictions of user interfaces of a system according to one embodiment of the present invention when measuring the dimensions of a box-like object (FIG. 1B) and a non-box-like (or arbitrary) object (FIG. 1C).

As shown in FIGS. 1B and 1C, the display device 122 of a system 100 according to one embodiment of the present invention displays a two-dimensional (2D) view 210 of an object 10 (a rectangular prism or a "box" in FIG. 1B or a box with a long handle extending therefrom in FIG. 1C) being measured by the system. The view 210 may also include a reticle or crosshairs 212.

As shown in FIGS. 1B and 1C, the system computes a three-dimensional (3D) bounding box 220 around the object 10 having a length (L), a width (W), and a height (H). Accordingly, the dimensions 230 of the object 10 (e.g., a minimal bounding box around the object 10) can be automatically computed and displayed to a user on the display device 122. In some circumstances, the system 100 may be in communication with an electronic scale or electronic balance that the object 10 is resting on, and the measured mass or weight 240 of the object 10 may also be shown on the display 122 of the system 100. In some circumstances, the weight or mass of the object may have been previously measured and stored in a memory (e.g., in a database) and retrieved for display on the display device 122.

Measuring the dimensions of a cuboidal or box-shaped object is of particular interest in fields such as shipping and logistics, where boxes of various sizes are encountered much more frequently than other shapes. Furthermore, the geometrically regular shape of a cuboidal object allows for optimizations to be made based on assumptions of characteristics of the object 10. These optimizations will be described in more detail below.

In some embodiments of the present invention, the depth camera system 100 is able to acquire color information (e.g., information about the colors of the surface of an object or its surface "texture") and geometric information (e.g., information about the size and shape of an object), such as an RGB-D (red, green, blue, and depth) camera. In the reminder of the disclosure, the term "RGB-D camera" is used to refer to such a system that can acquire color and geometric information, without loss of generality.

Like a regular camera, an RGB-D camera takes "pictures" of a scene by means of central optical projection. Whereas regular cameras can only measure the color of the light reflected by any visible point on the surface of an object, RGB-D cameras can also measure the distance ("depth") to the same points on the surface. By measuring the depth of a surface point visible at a pixel p, an RGB-D camera is able to compute the full 3-D location of this point. This is because a pixel p characterizes the single line of sight to the surface point; the depth along a line of sight determines the location where the line of sight intersects the surface point. The line of sight through pixel p can be computed from the camera's intrinsic parameters, which can be calibrated using standard procedures.

From a single snapshot (e.g., from a set of images captured from a particular pose of the RGB-D camera with respect to a scene) the RGB-D camera can produce a "depth map" (or "point cloud") from the disparity maps generated from the individual images captured by each of the 2-D cameras of the RGB-D camera. A depth map or depth image includes a set of 3-D locations (which may be defined with respect to the camera's reference frame) of the surface points of the scene that are visible from the depth camera. Each pixel in the depth map may be associated with a color (e.g., represented by a triplet of red (R), green (G), and blue (B) values) as captured for the particular pixel by the color camera.

In some embodiments of the present invention, the scanning system 100 is implemented in a handheld device. In this disclosure, the term "handheld device" refers to a device that can be comfortably held and manipulated with one or two hands, such as a smartphone, a tablet computer, or a purpose-specific scanner similar in size and shape to a portable barcode scanner with an attached display (or, alternatively, a smartphone with an attached handle and trigger).

In some embodiments of the present invention, the scanning system 100 is implemented as stationary device, such as one or more depth cameras rigidly mounted to a frame or other support structure and arranged to image objects on a conveyor belt or at a scanning station (e.g., a weighing location), and processing of the images captured by the one or more depth cameras may be performed by a processor and memory that are connected to the one or more depth cameras over a communication network (e.g., a local area network).

As noted above, aspects of embodiments of the present invention relate to systems and methods to compute the dimensions of a bounding box or minimal bounding box that would encompass an object. This may be thought of as a box that could be used to package the object, where the dimensions of the box are computed from observations of the object taken with a depth camera system 100. In the case of a minimal bounding box, the dimensions of a box minimize some particular characteristic, such as the volume, area, or perimeter of the bounding box such that encompasses the entirety of the object.

Some systems and methods in accordance with embodiments of the present invention automatically compute the size of a box (e.g., a rectangular cuboid) lying on the ground, that can tightly contain an object in a scene captured by an RGB-D camera. As discussed above, systems in accordance with embodiments of the present invention can be useful in many applications. For example, a shipping company might be interested in determining the correct size of a cardboard box that could be used as a container for an object. The ability to estimate the box size from one (or more) RGB-D pictures taken of the object, without the need to take physical measurements of the objects (e.g., with a measuring tape), make this approach particularly efficient and convenient (e.g., being able to estimate the box size in seconds versus minutes and using a contactless approach that does not require handling the box).

One specific application of embodiments of the present invention is in the measurement of box-shaped objects. Measuring the sizes of boxes is a frequent task in the context of logistics, where, for example, users may be interested in determining the total amount of space needed to contain a particular given set of boxes. When sizing box-shaped objects, embodiments of the present invention can obtain very reliable results by combining color information with geometric information. Furthermore, as noted above, the contact-less approach (e.g., computer vision-based approach using visible and invisible light) provided by embodiments of the present invention reduces the amount of time needed to measure each object, thereby improving, for example, logistics processes, by increasing throughput of boxes during physical measurement operations.

Depth Camera Hardware

In some embodiments of the present invention, the range cameras 100, also known as "depth cameras," include at least two standard two-dimensional cameras that have overlapping fields of view. In more detail, these two-dimensional (2-D) cameras may each include a digital image sensor such as a complementary metal oxide semiconductor (CMOS) image sensor or a charge coupled device (CCD) image sensor and an optical system (e.g., one or more lenses) configured to focus light onto the image sensor. The optical axes of the optical systems of the 2-D cameras may be substantially parallel such that the two cameras image substantially the same scene, albeit from slightly different perspectives. Accordingly, due to parallax, portions of a scene that are farther from the cameras will appear in substantially the same place in the images captured by the two cameras, whereas portions of a scene that are closer to the cameras will appear in different positions.

Using a geometrically calibrated depth camera, it is possible to identify the 3-D locations of all visible points on the surface of the object with respect to a reference coordinate system (e.g., a coordinate system having its origin at the depth camera). Thus, a range image or depth image captured by a range camera 100 can be represented as a "cloud" of 3-D points, which can be used to describe the portion of the surface of the object (as well as other surfaces within the field of view of the depth camera).

Figure 2:
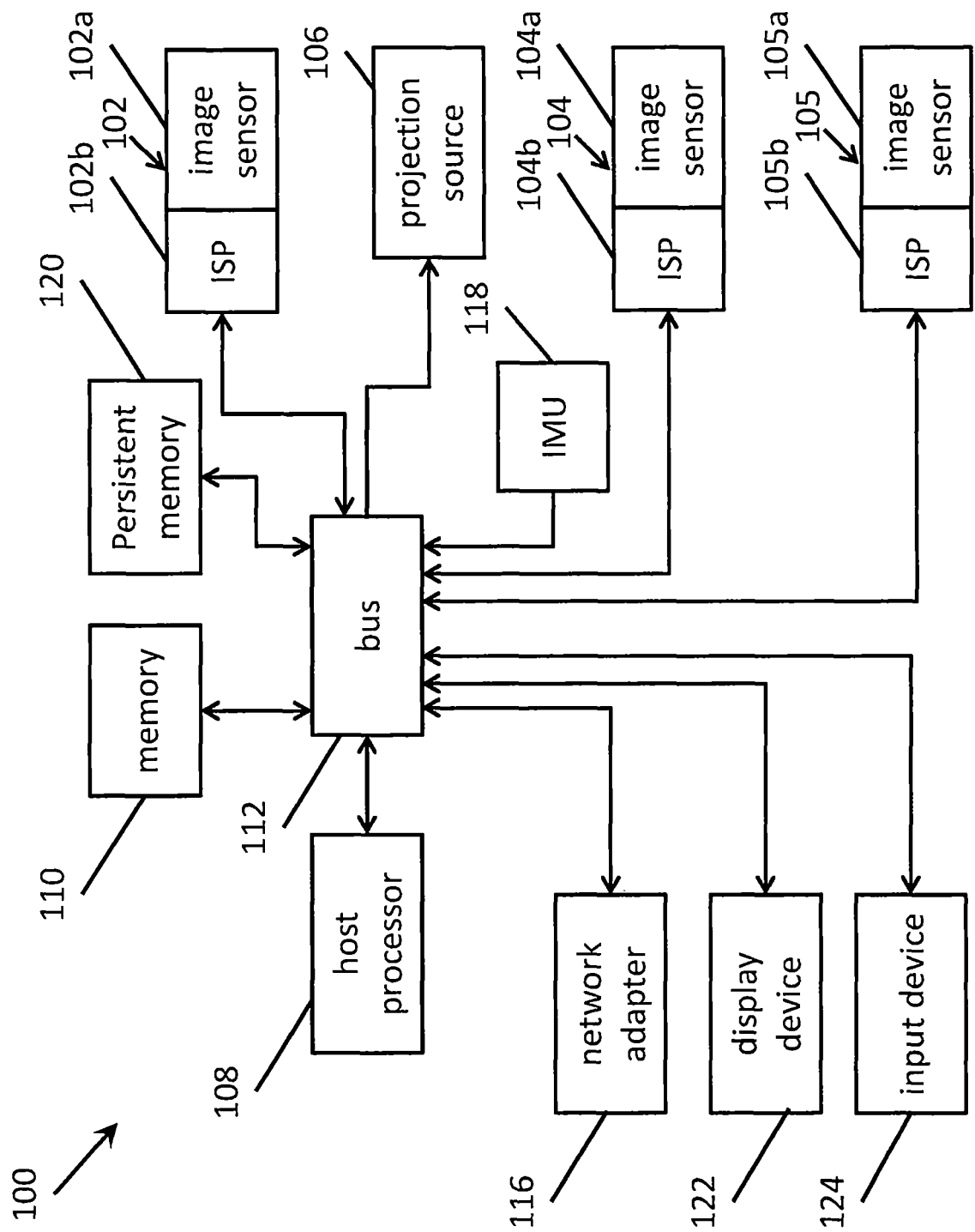
FIG. 2 is a block diagram of a stereo depth camera system according to one embodiment of the present invention.

FIG. 2 is a block diagram of a stereo depth camera system according to one embodiment of the present invention. The depth camera system 100 shown in FIG. 2 includes a first camera 102, a second camera 104, a projection source 106 (or illumination source or active projection system), and a host processor 108 and memory 110, wherein the host processor may be, for example, a graphics processing unit (GPU), a more general purpose processor (CPU), an appropriately configured field programmable gate array (FPGA), or an application specific integrated circuit (ASIC). The first camera 102 and the second camera 104 may be rigidly attached, e.g., on a frame, such that their relative positions and orientations are substantially fixed. The first camera 102 and the second camera 104 may be referred to together as a "depth camera." The first camera 102 and the second camera 104 include corresponding image sensors 102a and 104a, and may also include corresponding image signal processors (ISP) 102b and 104b. The various components may communicate with one another over a system bus 112. The depth camera system 100 may include additional components such as a network adapter 116 to communicate with other devices, an inertial measurement unit (IMU) 118 such as a gyroscope to detect acceleration of the depth camera 100 (e.g., detecting the direction of gravity to determine orientation), and persistent memory 120 such as NAND flash memory for storing data collected and processed by the depth camera system 100. The IMU 118 may be of the type commonly found in many modern smartphones. The image capture system may also include other communication components, such as a universal serial bus (USB) interface controller. In some embodiments, the depth camera system 100 further includes a display device 122 and one or more user input devices 124 (e.g., a touch sensitive panel of the display device 122 and/or one or more physical buttons or triggers).

Although the block diagram shown in FIG. 2 depicts a depth camera 100 as including two cameras 102 and 104 coupled to a host processor 108, memory 110, network adapter 116, IMU 118, and persistent memory 120, embodiments of the present invention are not limited thereto. For example, the three depth cameras 100 shown in FIG. 6 (described in more detail below) may each merely include cameras 102 and 104, projection source 106, and a communication component (e.g., a USB connection or a network adapter 116), and processing the two-dimensional images captured by the cameras 102 and 104 of the three depth cameras 100 may be performed by a shared processor or shared collection of processors in communication with the depth cameras 100 using their respective communication components or network adapters 116.

In some embodiments, the image sensors 102a and 104a of the cameras 102 and 104 are RGB-IR image sensors. Image sensors that are capable of detecting visible light (e.g., red-green-blue, or RGB) and invisible light (e.g., infrared or IR) information may be, for example, charged coupled device (CCD) or complementary metal oxide semiconductor (CMOS) sensors. Generally, a conventional RGB camera sensor includes pixels arranged in a "Bayer layout" or "RGBG layout," which is 50% green, 25% red, and 25% blue. Band pass filters (or "micro filters") are placed in front of individual photodiodes (e.g., between the photodiode and the optics associated with the camera) for each of the green, red, and blue wavelengths in accordance with the Bayer layout. Generally, a conventional RGB camera sensor also includes an infrared (IR) filter or IR cut-off filter (formed, e.g., as part of the lens or as a coating on the entire image sensor chip) which further blocks signals in an IR portion of electromagnetic spectrum.

An RGB-IR sensor is substantially similar to a conventional RGB sensor, but may include different color filters. For example, in an RGB-IR sensor, one of the green filters in every group of four photodiodes is replaced with an IR band-pass filter (or micro filter) to create a layout that is 25% green, 25% red, 25% blue, and 25% infrared, where the infrared pixels are intermingled among the visible light pixels. In addition, the IR cut-off filter may be omitted from the RGB-IR sensor, the IR cut-off filter may be located only over the pixels that detect red, green, and blue light, or the IR filter can be designed to pass visible light as well as light in a particular wavelength interval (e.g., 840-860 nm). An image sensor capable of capturing light in multiple portions or bands or spectral bands of the electromagnetic spectrum (e.g., red, blue, green, and infrared light) will be referred to herein as a "multi-channel" image sensor.

In some embodiments of the present invention, the image sensors 102a and 104a are conventional visible light sensors. In some embodiments of the present invention, the system includes one or more visible light cameras (e.g., RGB cameras) and, separately, one or more invisible light cameras (e.g., infrared cameras, where an IR band-pass filter is located across all over the pixels). In other embodiments of the present invention, the image sensors 102a and 104a are infrared (IR) light sensors. In some embodiments of the present invention, the image sensors 102a and 104a are infrared light (IR) sensors. In some embodiments (such as those in which the image sensors 102a and 104a are IR sensors) the depth camera 100 may include a third camera 105 including a color image sensor 105a (e.g., an image sensor configured to detect visible light in the red, green, and blue wavelengths, such as an image sensor arranged in a Bayer layout or RGBG layout) and an image signal processor 105b.

In some embodiments in which the depth cameras 100 include color image sensors (e.g., RGB sensors or RGB-IR sensors), the color image data collected by the depth cameras 100 may supplement the color image data captured by the color cameras 150. In addition, in some embodiments in which the depth cameras 100 include color image sensors (e.g., RGB sensors or RGB-IR sensors), the color cameras 150 may be omitted from the system.

Generally speaking, a stereoscopic depth camera system includes at least two cameras that are spaced apart from each other and rigidly mounted to a shared structure such as a rigid frame. The cameras are oriented in substantially the same direction (e.g., the optical axes of the cameras may be substantially parallel) and have overlapping fields of view. These individual cameras can be implemented using, for example, a complementary metal oxide semiconductor (CMOS) or a charge coupled device (CCD) image sensor with an optical system (e.g., including one or more lenses) configured to direct or focus light onto the image sensor. The optical system can determine the field of view of the camera, e.g., based on whether the optical system is implements a "wide angle" lens, a "telephoto" lens, or something in between.

In the following discussion, the image acquisition system of the depth camera system may be referred to as having at least two cameras, which may be referred to as a "master" camera and one or more "slave" cameras. Generally speaking, the estimated depth or disparity maps computed from the point of view of the master camera, but any of the cameras may be used as the master camera. As used herein, terms such as master/slave, left/right, above/below, first/second, and CAM1/CAM2 are used interchangeably unless noted. In other words, any one of the cameras may be master or a slave camera, and considerations for a camera on a left side with respect to a camera on its right may also apply, by symmetry, in the other direction. In addition, while the considerations presented below may be valid for various numbers of cameras, for the sake of convenience, they will generally be described in the context of a system that includes two cameras. For example, a depth camera system may include three cameras. In such systems, two of the cameras may be invisible light (infrared) cameras and the third camera may be a visible light (e.g., a red/blue/green color camera) camera. All three cameras may be optically registered (e.g., calibrated) with respect to one another. One example of a depth camera system including three cameras is described in U.S. patent application Ser. No. 15/147,879 "Depth Perceptive Trinocular Camera System" filed in the United States Patent and Trademark Office on May 5, 2016, the entire disclosure of which is incorporated by reference herein. Such a three camera system may also include an infrared illuminator configured to emit light in a wavelength interval that is detectable by the infrared cameras (e.g., 840-860 nm).

To detect the depth of a feature in a scene imaged by the cameras, the depth camera system determines the pixel location of the feature in each of the images captured by the cameras. The distance between the features in the two images is referred to as the disparity, which is inversely related to the distance or depth of the object. (This is the effect when comparing how much an object "shifts" when viewing the object with one eye at a time—the size of the shift depends on how far the object is from the viewer's eyes, where closer objects make a larger shift and farther objects make a smaller shift and objects in the distance may have little to no detectable shift.) Techniques for computing depth using disparity are described, for example, in R. Szeliski. "Computer Vision: Algorithms and Applications", Springer, 2010 pp. 467 et seq.

The magnitude of the disparity between the master and slave cameras depends on physical characteristics of the depth camera system, such as the pixel resolution of cameras, distance between the cameras and the fields of view of the cameras. Therefore, to generate accurate depth measurements, the depth camera system (or depth perceptive depth camera system) is calibrated based on these physical characteristics.

In some depth camera systems, the cameras may be arranged such that horizontal rows of the pixels of the image sensors of the cameras are substantially parallel. Image rectification techniques can be used to accommodate distortions to the images due to the shapes of the lenses of the cameras and variations of the orientations of the cameras.

In more detail, camera calibration information can provide information to rectify input images so that epipolar lines of the equivalent camera system are aligned with the scanlines of the rectified image. In such a case, a 3-D point in the scene projects onto the same scanline index in the master and in the slave image. Let $u_m$ and $u_s$ be the coordinates on the scanline of the image of the same 3-D point p in the master and slave equivalent cameras, respectively, where in each camera these coordinates refer to an axis system centered at the principal point (the intersection of the optical axis with the focal plane) and with horizontal axis parallel to the scanlines of the rectified image. The difference $u_s-u_m$ is called disparity and denoted by d; it is inversely proportional to the orthogonal distance of the 3-D point with respect to the rectified cameras (that is, the length of the orthogonal projection of the point onto the optical axis of either camera).

Stereoscopic algorithms exploit this property of the disparity. These algorithms achieve 3-D reconstruction by matching points (or features) detected in the left and right views, which is equivalent to estimating disparities. Block matching (BM) is a commonly used stereoscopic algorithm. Given a pixel in the master camera image, the algorithm computes the costs to match this pixel to any other pixel in the slave camera image. This cost function is defined as the dissimilarity between the image content within a small window surrounding the pixel in the master image and the pixel in the slave image. The optimal disparity at point is finally estimated as the argument of the minimum matching cost. This procedure is commonly addressed as Winner-Takes-All (WTA). These techniques are described in more detail, for example, in R. Szeliski. "Computer Vision: Algorithms and Applications", Springer, 2010. Since stereo algorithms like BM rely on appearance similarity, disparity computation becomes challenging if more than one pixel in the slave image have the same local appearance, as all of these pixels may be similar to the same pixel in the master image, resulting in ambiguous disparity estimation. A typical situation in which this may occur is when visualizing a scene with constant brightness, such as a flat wall.

Methods exist that provide additional illumination by projecting a pattern that is designed to improve or optimize the performance of block matching algorithm that can capture small 3-D details such as the one described in U.S. Pat. No. 9,392,262 "System and Method for 3-D Reconstruction Using Multiple Multi-Channel Cameras," issued on Jul. 12, 2016, the entire disclosure of which is incorporated herein by reference. Another approach projects a pattern that is purely used to provide a texture to the scene and particularly improve the depth estimation of texture-less regions by disambiguating portions of the scene that would otherwise appear the same.

The projection source 106 according to embodiments of the present invention may be configured to emit visible light (e.g., light within the spectrum visible to humans and/or other animals) or invisible light (e.g., infrared light) toward the scene imaged by the cameras 102 and 104. In other words, the projection source may have an optical axis substantially parallel to the optical axes of the cameras 102 and 104 and may be configured to emit light in the direction of the fields of view of the cameras 102 and 104. Arrangements in which two cameras 102 and 104 are arranged with a projection source 106 in this manner is sometimes referred to as "active stereo." In some embodiments, the projection source 106 may include multiple separate illuminators, each having an optical axis spaced apart from the optical axis (or axes) of the other illuminator (or illuminators), and spaced apart from the optical axes of the cameras 102 and 104.

An invisible light projection source may be better suited to for situations where the subjects are people (such as in a videoconferencing system) because invisible light would not interfere with the subject's ability to see, whereas a visible light projection source may shine uncomfortably into the subject's eyes or may undesirably affect the experience by adding patterns to the scene. Examples of systems that include invisible light projection sources are described, for example, in U.S. patent application Ser. No. 14/788,078 "Systems and Methods for Multi-Channel Imaging Based on Multiple Exposure Settings," filed in the United States Patent and Trademark Office on Jun. 30, 2015, the entire disclosure of which is herein incorporated by reference.

Active projection sources can also be classified as projecting static patterns, e.g., patterns that do not change over time, and dynamic patterns, e.g., patterns that do change over time. In both cases, one aspect of the pattern is the illumination level of the projected pattern. This may be relevant because it can influence the depth dynamic range of the depth camera system. For example, if the optical illumination is at a high level, then depth measurements can be made of distant objects (e.g., to overcome the diminishing of the optical illumination over the distance to the object, by a factor proportional to the inverse square of the distance) and under bright ambient light conditions. However, a high optical illumination level may cause saturation of parts of the scene that are close-up. On the other hand, a low optical illumination level can allow the measurement of close objects, but not distant objects.

Depth computations may fail in some region areas due to multiple factors, including: the mechanism used to compute depth (triangulation, with or without an active illuminator, or time of flight); the geometry of the scene (such as the angle between each surface element and the associated line of sight, or the presence of partial occlusion which may impede view by either sensor in a stereo system); and the reflectivity characteristics of the surface (such as the presence of a specular component which may hinder stereo matching or reflect away light from a projector, or a very low albedo causing insufficient light reflected by the surface). For those pixels of the depth image where depth computation fails or is unreliable, only color information may be available.

Although embodiments of the present invention are described herein with respect to stereo depth camera systems, embodiments of the present invention are not limited thereto and may also be used with other depth camera systems such as structured light time of flight cameras and LIDAR cameras.

Depending on the choice of camera, different techniques may be used to generate the 3-D model. For example, Dense Tracking and Mapping in Real Time (DTAM) uses color cues for scanning and Simultaneous Localization and Mapping (SLAM) uses depth data (or a combination of depth and color data) to generate the 3-D model.

Volume Measurements from 3-D Models

The problem of fitting a shape to a point cloud has been the object of intense research in computational geometry, computer vision, computer graphics, and robotics. A classic algorithm (O'Rourke, J. (1985). Finding minimal enclosing boxes. *International Journal of Parallel Programming*, 14(3), 183-199.) finds the minimum volume enclosing box using a 3-D "rotation caliper" approach (Toussaint, G. T. (1983). Solving geometric problems with the rotating calipers. In *Proc. IEEE Melecon* (Vol. 83, p. A10). The computational cost of this algorithm grows cubically with the number of points in the 3-D model.

An approximation to the minimum volume bounding box can be computed in linear time (Barequet, G., & Har-Peled, S. (2001). Efficiently approximating the minimum-volume bounding box of a point set in three dimensions. *Journal of Algorithms*, 38(1), 91-109.) using an appropriate "coreset" (a small set of points with approximately the same bounding box as the original point set (Agarwal, P. K., Har-Peled, S., & Varadarajan, K. R. (2005). Geometric approximation via coresets. *Combinatorial and computational geometry*, 52, 1-30.). Both algorithms require prior computation of the convex hull of the point set (Chang, C. T., Gorissen, B., & Melchior, S. (2011). Fast oriented bounding box optimization on the rotation group SO (3, $\mathbb{R}$ ). *ACM Transactions on Graphics (TOG)*, 30(5), 122.) and formulate the minimum volume bounding box problem as an unconstrained optimization task on the rotation group.

Bounding boxes can be split into box trees (see, e.g., Gottschalk, S., Lin, M. C., & Manocha, D. (1996). OBBTree: A hierarchical structure for rapid interference detection. In *Proceedings of the 23rd annual conference on Computer graphics and interactive techniques* (pp. 171-180). ACM.), to generate tight fitting parameterizable models, which can be useful in applications such as robot grasping (Huebner, K., Ruthotto, S., & Kragic, D. (2008). Minimum volume bounding box decomposition for shape approximation in robot grasping. In *Robotics and Automation, 2008. ICRA 2008. IEEE International Conference on* (pp. 1628-1633). IEEE.).

Bounding boxes fitted around individual objects, as computed from RGB-D data, have also been used to study support and stability of a scene (see, e.g., Jia, Z., Gallagher, A., Saxena, A., & Chen, T. (2013). 3D-based reasoning with blocks, support, and stability. In *Proceedings of the IEEE Conference on Computer Vision and Pattern Recognition*.).

All of these comparative techniques consider arbitrary positions and orientations for the boxes, and accommodating these arbitrary positions and orientations can result in long running times (e.g., high computational complexity, such as the above-mentioned cubic or $O(n^3)$ algorithm, where n is the number of points in the 3-D model, for the "rotating calipers" approach). In contrast, aspects of embodiments of the present invention make an assumption that the object or box to be measured lies on the ground, and determines the size of an enclosing cuboid (e.g., rectangular prism) that itself has one face that lies on the ground (e.g., has one face that is parallel to and in contact with the ground). In most practical scenarios, this assumption is not particularly limiting, because, generally speaking, a box is physically more stable when resting on one of its faces as opposed to on one of its edges or corners, and other objects may have one or more natural orientations that would also correspond to the orientations of the objects when packaged in a box (e.g., televisions and computer displays, containers of liquids, and the like). Accordingly, the majority of boxes and objects encountered in practice are oriented with one face against the ground and, if they are not, can be manipulated to place one face on the ground.

For the sake of convenience, the surface on which the object rests will be referred to herein as the "ground" or "ground plane" without limitation to a particular actual height of a horizontal surface in a particular environment. For example, embodiments of the present invention are equally applicable in situations in which the object or box lies on an elevated horizontal surface, such as a table, an elevated weighing scale, the bed of a truck, and the like. Furthermore, embodiments of the present invention do not require the ground or ground plane to be completely horizontal (e.g., perpendicular to the direction of gravity), but may also be applicable in circumstances where the ground or ground plane is slightly tilted with respect to the horizontal plane.

By only computing enclosing boxes with one side lying on the ground, embodiments of the present invention speed up computation considerably with respect to comparative techniques. This allows embodiments of the present invention to provide rapid measurements of the dimensions of an object (e.g., on the order of seconds or less, rather than minutes), thereby providing easy usability in dynamic working conditions such as a warehouse or shipping center.

In addition, some comparative techniques consider 3-D data (e.g., a computed point cloud) without reference to the color of the surface points. In contrast, aspects of embodiments of the present invention relate to use of color information in addition to depth information. Color information is useful in situations in which depth cannot be computed reliably over the whole surface of the object.

Aspects of embodiments of the present invention will be described below with respect to two different variants, referred to herein as "modules" for computing the dimensions of a box enclosing an object seen by an RGB-D camera. The first module operates on generic objects (e.g., without making assumptions about the shape of the object). The second module is specialized for objects that have a cuboidal (e.g., box) shape. Both modules return the parameters (e.g., length, width, and height) of a tight (e.g., minimal) box lying on the ground that encloses the object imaged by the RGB-D camera.

Objects can typically be characterized by both specific surface colors (e.g., different colors on different portions of the surface of the object) and geometry (although these may be subject to variation between different instances of the same object, such as variations in the surface shape of a soft handbag or duffel bag based on the locations and depth of folds in the material). This type of information can be used to estimate the size and dimensions of the objects themselves, as described in more detail below.

The color and geometry of an object can be obtained using specialized hardware such as an RGB-D camera of a depth camera system 100, as described above. An RGB-D camera according to some embodiments includes one or more color cameras (e.g., color camera 105), which acquire the color information of a scene imaged by the one or more color cameras and by one or more depth cameras (e.g., cameras 102 and 104), which acquire the geometry information (e.g., using infrared light). In some embodiments, the RGB-D camera includes one or more color cameras and one or more Infra-Red (IR) cameras, which, coupled with an IR structured-light illuminator (e.g., projection source 106), constitute the depth camera. The case in which there are two IR cameras and an IR structured-light illuminator is called active stereo.

The color camera and the depth camera can be synchronized and geometrically calibrated, allowing it to capture sequences of frames that are constituted by color images and corresponding depth maps, which can be geometrically aligned (e.g., each pixel or location of a depth map can be correlated with a corresponding color from a color image, thereby allowing capture of the surface colors of the scene). The combination of a depth map and a color image captured at substantially the same time as the depth map may be referred to as a "frame" of data. In this case, a color image with a depth map (or "depth image") may be called an RGB-D frame, which contains color (RGB) and depth (D) information, as if both were acquired by a single camera with a single shutter and a single vantage point (even though the individual cameras 102, 104, and 105 are physically located in slightly different locations).

As noted above, the depth camera system 100 may include an Inertial Measurement Unit (IMU) 118, which include an accelerometer (e.g., a 3-axis accelerometer) that is synchronized with the RGB-D camera at either a software level or at a hardware level and that can be optionally calibrated with the RGB-D camera in terms of their relative spatial locations (e.g., the IMU 118 may be rigidly connected to the cameras 102, 104, and 105). Accordingly, the IMU 118 can provide information about the acceleration and/or orientation of the depth camera system 100, and thereby provide information about the orientation of the depth camera system 100 relative to the captured depth frames. For example, the IMU 118 can be used to identify which direction in the captured depth frame is "down" (in the direction of gravity).

The various operations according to embodiments of the present invention, as discussed in more detail, below may be performed using one or more computing devices configured to receive the depth frames captured by the depth camera system 100. In some embodiments, all of the operations are performed in a single computing device (e.g., the host processor 108 and the memory 110 of the depth camera system 100). In other embodiments of the present invention, the computed RGB-D frames from the depth camera system are analyzed by a processor and memory of a separate computing device or a separate processor and memory physically coupled to the depth camera system. In addition, various operations may be implemented using one or more of general-purpose or specific-purpose processing units such as a general purpose central processing unit (CPU), a graphical processing unit (GPU), a field programmable gate array (FPGA), and/or an application specific integrated circuit (ASIC), which may store data in memory (e.g., dynamic memory and/or static memory) and receive and/or transmit data through input/output (I/O) interfaces (e.g., universal serial bus or USB, serial) and networking interfaces (e.g., wireless local area networks such as IEEE 802.11b/g/n/ac WiFi, wired local area networks such as IEEE 802.3 Ethernet, 3G/4G cellular connectivity, and Bluetooth®) to execute a set of instructions in order to perform volumetric box fitting in accordance with embodiments of the present invention.

In some embodiments of the invention, other sensors are connected to the computing device through the I/O or networking interfaces. For example, an electronic scale may provide measurements of the weight of the object, and a barcode decoding system may provide an identifier (e.g., a Universal Product Code or UPC) of the object in order to allow metadata about the object to be retrieved from a database or other data store. In some embodiments, the barcode decoding system may use an image of a barcode captured by a color camera of the depth cameras system (e.g., applying image rectification to a barcode appearing in a portion of the color image).

Computing Bounding Boxes of Objects

Figure 3:
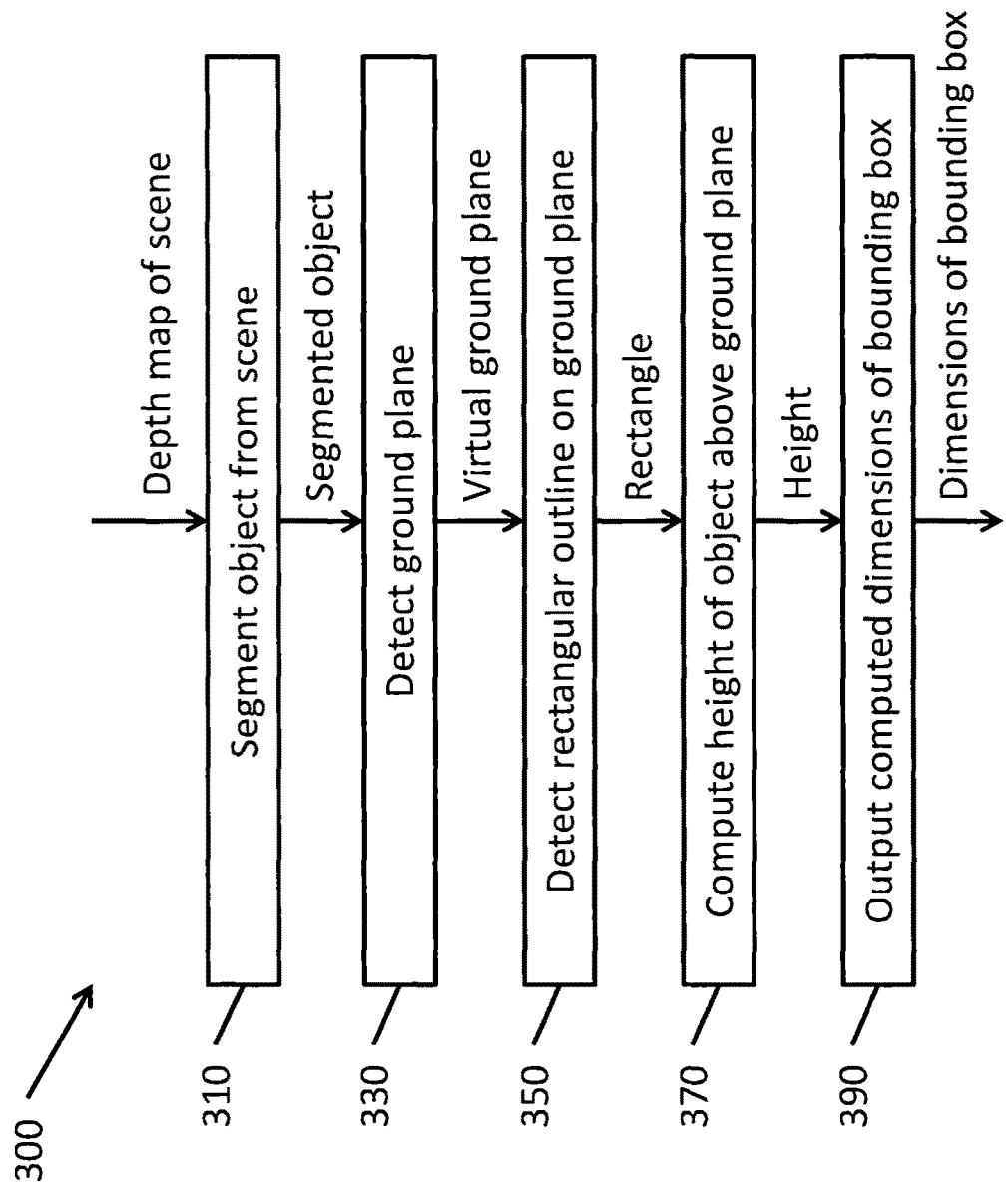
FIG. 3 is a flowchart of a method for measuring dimensions of object according to one embodiment of the present invention.

As noted above, some aspects of embodiments of the present invention relate to computing bounding boxes of objects (e.g., arbitrary objects). FIG. 3 is a flowchart of a method for measuring dimensions of object according to one embodiment of the present invention.

In some embodiments of the present invention, the process begins with a depth map of a scene including an object and proceeds with segmenting 310 the object from the scene, detecting 330 the ground plane that the object is resting on, detecting a 350 rectangular outline of the object, projected onto the ground plane, computing 370 a height of the object above the ground plane, and outputting 390 the computed dimensions of the bounding box surrounding the object. The depth map of the scene may be captured using a depth camera system 100 as described above (e.g., an RGB-D camera). As noted above, for the sake of convenience, the operations will be described herein as being performed by the host processor 108 of the depth camera system 100, but embodiments of the present invention are not limited thereto and, in some embodiments, various operations may be performed by one or more other computing devices such as a CPU, a GPU, an FPGA, and/or an ASIC, where the one or more other computing devices may be integrated into the same physical device as the depth camera system 100 (e.g., enclosed in the same housing and/or located on the same circuit board) and/or from the depth camera system 100 (e.g., in communication with the depth camera system through one or more of the I/O interfaces and/or the network interfaces 116).

As shown in FIGS. 1B and 1C, a scene 8 captured by a depth camera system 100 may include an object of interest 10 in the foreground along with clutter 12 in the background. In some embodiments of the present invention, the depth camera system 100 is controlled to capture a depth frame when a trigger (e.g., a software button shown on a display device or a physical trigger button) is activated. Embodiments of the present invention will be described below primarily in the context of analyzing a depth map corresponding to a single view of the object. Computing dimensions of an object from a single view increases the usability of a hand-held scanning device. Furthermore, such a handheld scanning device may be more adaptable to different situations and may be more cost effective than a stationary scanning device fixed to a particular location. However, embodiments of the present invention are not limited thereto and may also be applied in circumstances where multiple views of the object (from multiple different poses with respect to the object) are combined to generate a 3-D model of the object from multiple sides (e.g., a "point cloud" representing the scene including the object).

In operation 310, the processor 108 segments the object from the scene. In some embodiments, the object is separated or "segmented" from the other objects in the scene (e.g., the pixels corresponding to the clutter 12 may be ignored in the following operations or deleted from the captured depth map). The object may be resting on a ground (or horizontal surface) 14.

According to some embodiments of the present invention, the portion of the 3-D model (e.g., the pixels of the RGB-D frame or the points of the point cloud) corresponding to the object 10 are identified by selecting the points of the point cloud (or vertices of the 3-D model) or the pixels of the RGB-D frame that are closest to the viewpoint of the depth camera system (in some embodiments, this determination is also be weighted in accordance with how close the points are to the center of the image, in order to remove nearby clutter at the edges of the image). This is based on the assumption that the object of interest 10 will generally be the object in the scene that is closest to the camera (e.g., in the foreground). In some embodiments of the present invention, a reticle 250 (or crosshairs) may be shown in the view, and the pixels under the crosshairs are selected as initial points corresponding to the object of interest 10. The reticle 250 can improve usability of the system by providing the user with a visual cue for specifying which particular portions of the view correspond to the object of interest 10, rather than relying on a heuristic by the system.

Once initial points or pixels of the object of interest 10 have been selected, in some embodiments of the present invention, a "flood fill" operation may be performed to select the remaining portions of the object that are visible in the scene. This is similar to a flood fill operation in 2-D graphics, where an initial pixel may be selected and neighboring pixels that are within a threshold distance in color space (e.g., similarly colored pixels) are added to the set of selected pixels, and the process iteratively adds neighboring pixels that satisfy the condition, until no more pixels can be added to the selection.

In more detail, in one embodiment of the present invention, the 3-D flood fill operation begins by identifying initial points of the object, and then adding pixels that are close enough to be considered "continuous" and adjacent to currently selected pixels in 3-D space. For example, referring to FIG. 1B, the corner of the box may be the identified as initial points of the object in view of being the closest to the camera and closest to the center of the image. Points or pixels near the corner of the box closest to the camera will be close to (and considered "continuous" with) the point corresponding to the corner of the box. Likewise, pixels along the top, front, and side surface of the box will be considered "continuous" and close to their adjacent pixels in the scene. On the other hand, the 3-D position of points of the clutter 12 behind the box 10 will be "discontinuous" with the top surface of the box, because there will be a large change in the range (e.g., distance from the depth camera system 100) when transitioning from the top surface of the box 10 to a surface of the clutter 12.

Figure 4B:
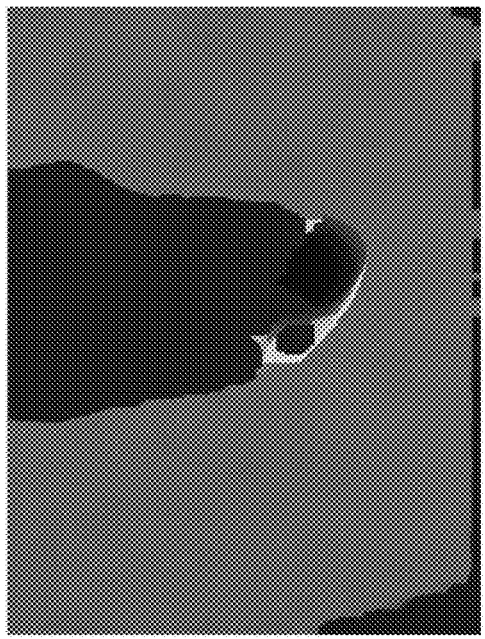
FIG. 4B is an orthogonal view of the depth map shown in FIG. 4A with the ground plane aligned perpendicular to the optical axis of the virtual camera.
Figure 4D:
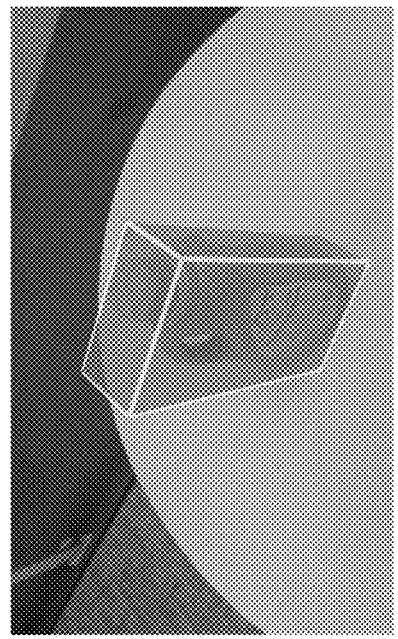
FIG. 4D is a color image of the scene including a bottle as depicted in the depth map of FIG. 4A, with a bounding box computed in accordance with embodiments of the present invention overlaid on the view of the bottle.
Figure 4A:
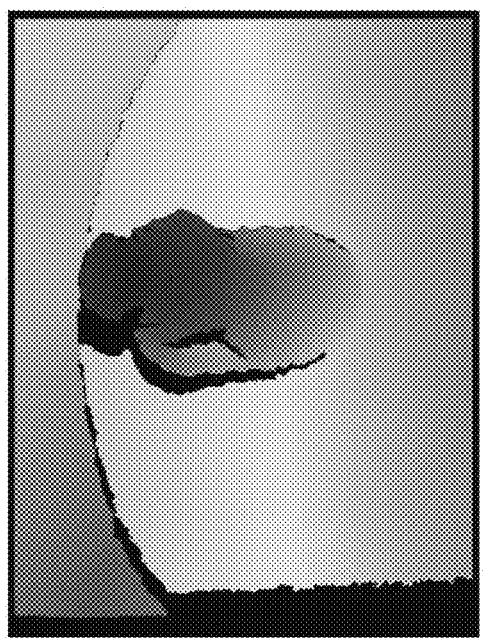
FIG. 4A is a depiction of a depth map of a scene depicting a bottle of laundry detergent on a table.

FIG. 4A is a depiction of a depth map of a scene depicting a bottle of laundry detergent on a table. In the depth map, blue pixels represent longer distances, green and yellow pixels represent mid-range distances, and red pixels depict shorter distances. The bottle shown in FIG. 4A, can be segmented from the background based on discontinuity between the edges of the bottle in red and the adjacent pixels (corresponding to the table) in yellow and green.

In operation 330, the processor 108 detects a ground plane of the scene. As discussed above, the ground plane is assumed to be the substantially planar surface of the scene that the object of interest 10 is resting on a ground surface 14.

The correctness of the methods described herein relies on the computation of an accurate ground plane. In some embodiments, methods such as random sample consensus (RANSAC) are used to compute the model (in this case, a planar model) that is consistent with most observations (in this case, the 3-D points measured by the RGB-D camera). In some embodiments of the present invention, computing the ground plane uses data from a 3-axis accelerometer (or IMU 118) of the depth camera system 100, and geometrically calibrated with the depth camera system 100. When the IMU 118 is kept in a static position, it produces a triplet of numbers that represents the direction of the gravity vector (orthogonal to the ground plane). This automatically determines the orientation of the ground plane. The actual location of the ground plane can then be estimated from the captured 3-D depth map. For example, in some embodiments, the processor is controlled to select the closest plane to the camera that is consistent with the expected orientation of the ground plane determined by the IMU 118, such that all 3-D points measured from the depth camera system 100 are above this selected closest plane.

In some aspects of embodiments of the present invention, the points or pixels of the scene corresponding to the ground plane can be detected by following the pixels corresponding to the object downward (e.g., based on the "down" direction as detected by the IMU 118), and identifying all of the pixels that are at the same height (e.g., along a plane corresponding to the points on pixels around the base of the object 10), within a threshold value.

Some aspects of embodiments of the present invention relate to calculating a virtual ground plane based on an idealized ground plane, as estimated from the captured depth map. Generally speaking, depth camera systems such as the RGB-D camera system described above are subject to noise (e.g., errors), where the magnitude of the noise increases super-linearly with distance from the sensor (e.g., the noise may increase with the square of the distance from the sensor).

Figure 5A:
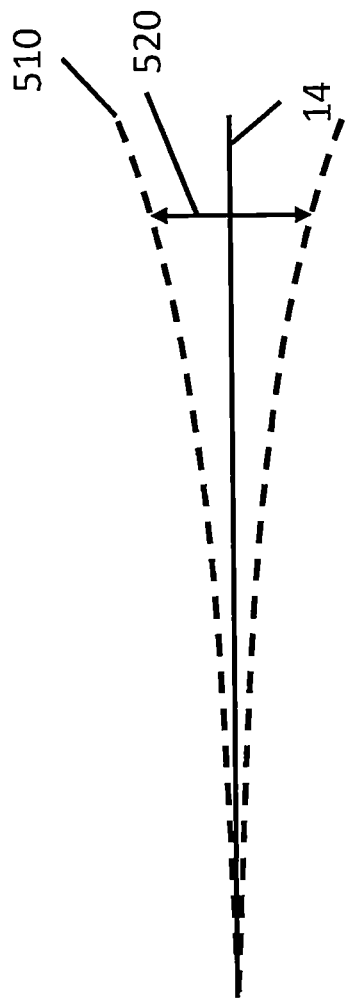
FIG. 5A is a schematic illustration of noise in a depth sensing system according to one embodiment of the present invention.
Figure 5A:
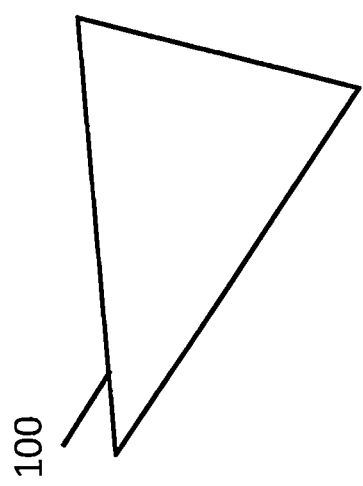

FIG. 5A is a schematic illustration of noise in a depth sensing system according to one embodiment of the present invention. In the schematic illustration of FIG. 5A, a depth camera system 100 images a scene that includes a ground plane 14. As shown by the dotted lines 510 depicting the variance in the computed or estimated positions of the ground plane 14, as the distance between the depth camera system 100 and surfaces in the scene increases, the amount of noise 520 in the computed positions of the surfaces also increases. This may correspond to the estimated positions of the ground plane as being above or below the actual height of the ground plane 14.

Figure 5B:
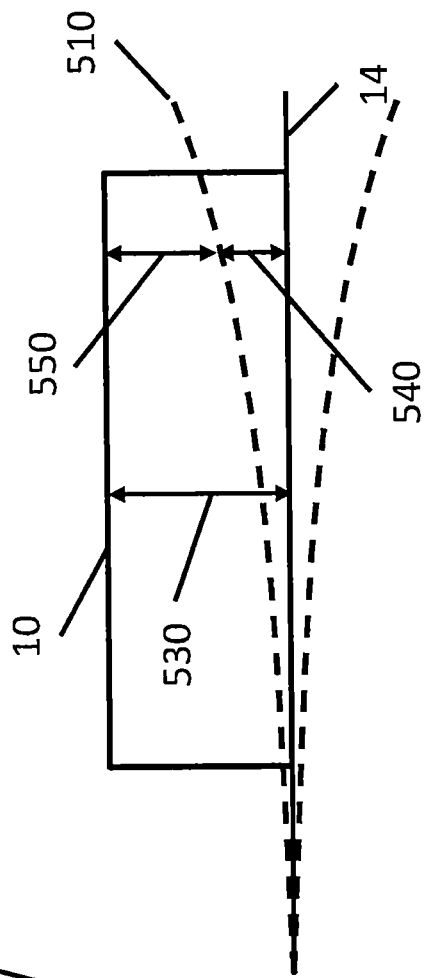
FIG. 5B is a schematic illustration of interactions between objects in a scene and noise in a depth sensing system according to one embodiment of the present invention.
Figure 5B:
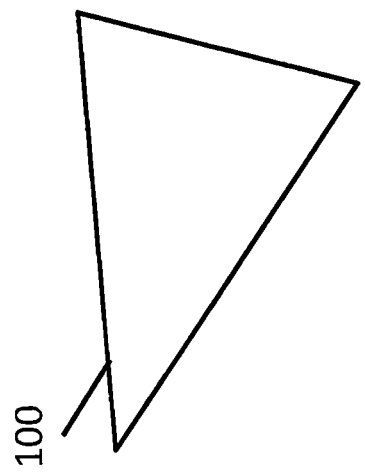

FIG. 5B is a schematic illustration of interactions between objects in a scene and noise in a depth sensing system according to one embodiment of the present invention. FIG. 5B is substantially similar to FIG. 5A, but further includes a cross-section of an object 10 in the scene. The height 530 of the object 10 is taken to be the distance between the top of the object 10 and the ground plane. However, noise 510 in the measured position 540 of the ground plane can cause errors in the measured height 550 of the object 10 (between the top of the object 10 and the measured position of the ground plane) to be different from the actual height 530. (For the sake of convenience, the depiction in FIG. 5B ignores the noise in the measured location of the top of the object 10, and that this additional noise causes further inaccuracies in calculating the height of the object 10).

Therefore, some aspects of embodiments of the present invention relate to systems and methods for defining a virtual ground plane that is more accurate than the ground plane extracted directly from a depth image. As shown in FIGS. 5A and 5B, the noise in the depth map increases with distance from the depth camera system 100. Furthermore, in the usage scenarios described herein, the points or pixels at the bottom of the depth frame generally correspond to the ground plane 14 that the object 10 is resting on. See, for example, FIG. 4A, in which the orange pixels at the bottom of the image are part of the ground (e.g., the table) that the bottle is resting on.

Figure 5C:
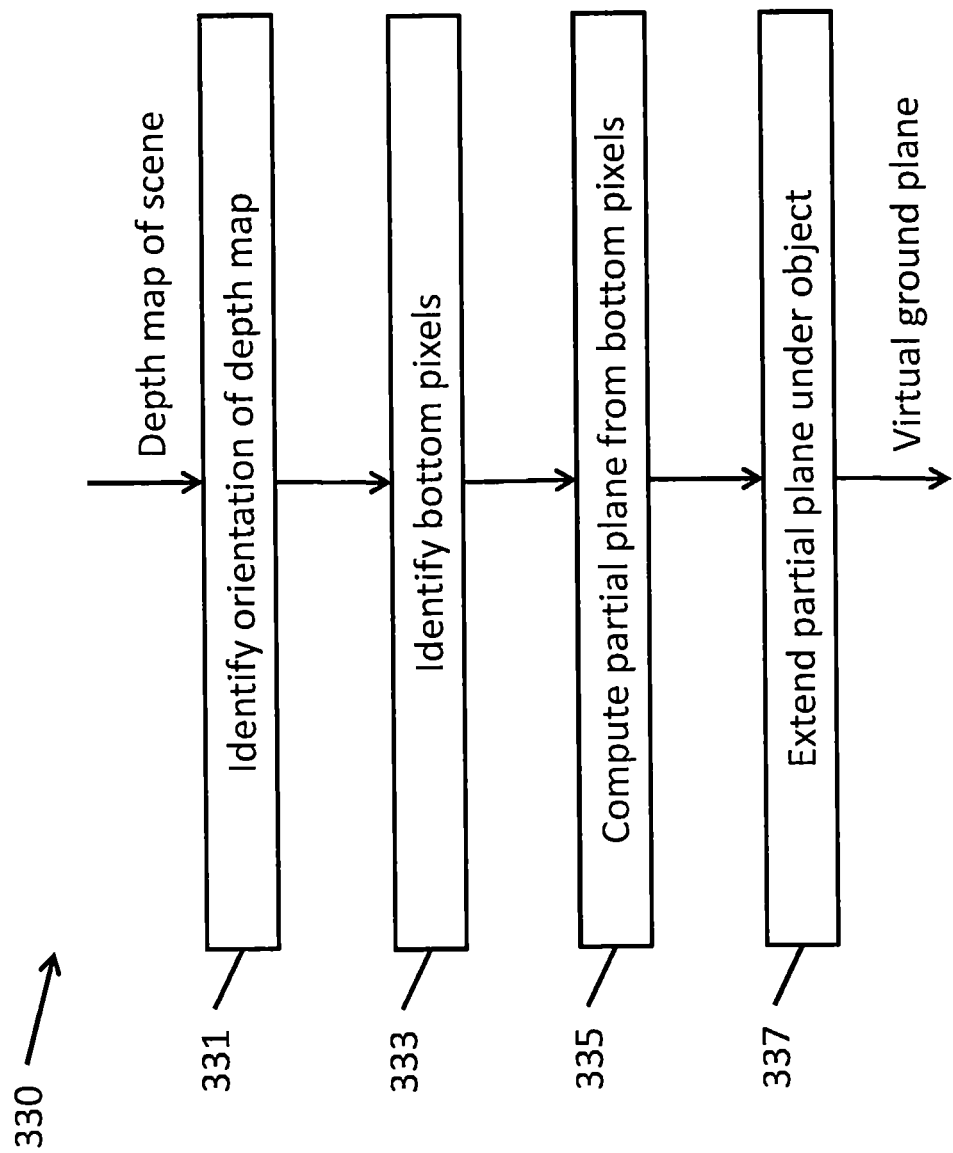
FIG. 5C is a flowchart of a method for computing a virtual ground plane according to one embodiment of the present invention.

FIG. 5C is a flowchart of a method 330 for computing a virtual ground plane according to one embodiment of the present invention. In operation 331, the processor analyzes the input depth map of the scene (e.g., with the object of interest 10 segmented) and identifies an orientation of the depth map to determine which direction corresponds to the direction of gravity (informally, the "down" direction) As noted above, the orientation information may be recorded from the IMU 118 at the time that the depth map is captured. In operation 333, the "bottom" pixels or points of the depth map are identified, where "bottom" refers to the portion of the image in the "down" direction identified in operation 331. The bottom of the depth map is assumed to correspond to the closest part of the ground plane 14, which extends away from the depth camera and "up" in the depth map (e.g., toward the top of the image).

For example, in the depth map shown in FIG. 4A, the "down" direction corresponds to the direction perpendicular to the ground plane an parallel to the vertical axis of the bottle, and the portion of the depth map corresponding to the "bottom" pixels or points are the orange strip at the lower edge of the image.

In some embodiments, the processor controls the width of the strip of bottom pixels that are identified in operation 333 based on known noise characteristics of the depth camera system 100 (e.g., noise as a function of distance or range of a pixel). The noise characteristics of the depth camera system 100 may include parameters that are stored in the memory of the depth camera system 100 and previously computed by measuring differences between depth maps captured by the depth camera system 100 (or substantially equivalent depth camera systems) and/or parameters computed based on, for example, theoretical predictions noise in the camera image sensors (e.g., image sensors 102a, 104a, and 105a), characteristics of the pattern emitted by the projection source 106, the image resolutions of the image sensors, and constraints of the disparity matching technique. For example, a particular level of error may be acceptable for particular applications. Accordingly, in some embodiments, pixels from the bottom edge of the depth map up until the pixels represent distances that exceed the acceptable error threshold (based on the known noise characteristics of the depth camera as a function of distance or range) are selected as part of the ground plane (subtracting the points or pixels corresponding to the segmented object, if any such pixels were included in this process).

In operation 335, the processer uses the bottom points or pixels, which are assumed to lie on the same ground plane 14 that is supporting the object 10, to define a partial ground plane or partial plane. For example, in some embodiments, linear regression is applied to the selected bottom points (or depth pixels) along two directions (e.g., two horizontal directions perpendicular to the direction of gravity) to define a virtual ground plane (or an "ideal" virtual ground plane) in accordance with a linear function. In some embodiments of the present invention, outlier points or pixels (e.g., corresponding to noise or foreground clutter objects) are removed from the bottom points or pixels before computing the plane.

In operation 337, the virtual ground plane defined by the selected ones of the bottom pixels of the depth map is extended to the region under the object of interest 10. Accordingly, aspects of embodiments of the present invention relate to defining a virtual ground plane based on portions of the captured depth map (or 3-D model) that exhibit lower noise (e.g., a portion of the ground 14 that is closer to the depth camera system 100). Based on the assumption that the ground 14 is substantially planar or flat between the low noise portion of the ground 14 closest to the depth camera system 100 and the parts of the ground 14 at the object 10, this virtual ground plane can be extended to the region under the object 10. This increases the accuracy of the measurements of the dimensions of the object in later operations 350 and 370, as described in more detail below.

In operation 350, the processor detects a rectangular outline of the object on the ground plane.

FIG. 4B is an orthogonal view of the depth map shown in FIG. 4A with the ground plane aligned perpendicular to the optical axis of the virtual camera. The large region of lighter red represents the portion of the ground plane that was visible to the depth camera system 100 in FIG. 4A. The darker red portion of FIG. 4B corresponds to the portions of the ground plane that were occluded by the bottle when the depth map was captured. The brighter colored portions of the depth map near the center of FIG. 4B correspond to the bottle (these portions are depicted in yellow and blue because this particular orthogonal view is taken from "underneath" the ground plane), and these brighter colored portions represent the projection of the points of the object 10 onto the virtual ground plane. This process is equivalent to "smashing" all of the points of the depth map corresponding to the object 10 down to the ground plane (e.g., assuming that ground plane extends along the x-z axes of the 3-D model at the y coordinate of zero (0), this is equivalent to setting the y coordinates of all of the points of the object 10 to zero (0)).

Figure 4C:
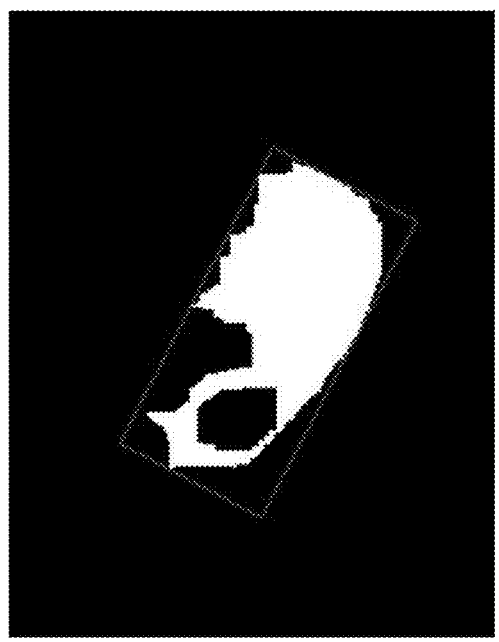
FIG. 4C depicts the vertically projected points of the object 10 in white and the rest of the image in black, with a red rectangle on the ground plane that contains all the vertical projections of the object's surface points according to one embodiment of the present invention.

This results in a set of 2-D points that are defined in reference to a frame fixed to the ground plane. Projecting the points of a box with a face lying on the ground (and thus parallel to the ground plane), would generate a rectangular trace (likewise, the projection of any right prism standing on one of its bases would generate a trace shaped like its base). If a box encloses the object 10, then a rectangular trace bounding its vertically projected points should also contain all of the vertical projections of the object's surface points. FIG. 4C depicts the vertically projected points of the object 10 in white and the rest of the image in black, with a red rectangle on the ground plane that contains all the vertical projections of the object's surface points according to one embodiment of the present invention.

In some circumstances, other surfaces (e.g., from portions of clutter 12) in the scene besides the object 10 and the ground plane 14 are visible by the depth camera system 100, these points could be incorrectly considered in the computation of the enclosing box. In order to reduce the risk of these occurrences, in some embodiments, the processor computes the connected components of a graph defined on the ground plane, where the vertical projections of measured 3-D points of the surfaces in the scene, including the surfaces of the object, form the vertices of the graph, and two such vertices are connected by an edge if their distance is smaller than a threshold. Once the connected components of projection points have been computed, some embodiments, for example, keep the largest connected component, under the assumption that the object of interest occupies a larger portion in the image than other visible surfaces, thereby providing an alternative and/or additional technique for segmenting the object 10 from the clutter 12 in the scene (e.g., in additional to segmentation performed in operation 310).

Thus, an enclosing box for an object can be determined by determining a rectangle on the ground plane 14 that contains all the vertical projections of the object's surface points and extending the rectangle vertically to the top of the object. In some embodiments of the present invention, the enclosing box is a minimum volume enclosing box or minimum bounding box—in other words, the smallest box that encloses all of the points of the object, where "smallest" may refer to volume, area, or perimeter of the box, in accordance with particular application requirements (e.g., minimizing area to reduce the amount of packing material consumed versus minimizing volume to reduce the amount of space used to store or transport the object).

According to one embodiment, the minimum volume enclosing box can be computed by first determining, in operation 350, the minimum area rectangle enclosing the points of the object 10 projected onto the virtual ground plane. In some embodiments, a two-dimensional rotating calipers approach is used to compute the minimum area rectangle in linear time. The processor determines the height of this box in operation 370 as being equal to the maximum distance of any surface point of the object to the virtual ground plane. Note that the minimum area rectangle can be computed in a time linear to the number of enclosed points using standard rotating caliper methods. It is also possible to compute (again in linear time) the minimum surface enclosing box, by finding the minimum perimeter enclosing rectangle on the ground plane. Accordingly, aspects of embodiments of the present invention are able to compute a three-dimensional bounding box of an object in linear time with respect to the number of points; as opposed to in cubic time of the comparative techniques described above, thereby also enabling faster response (e.g., real-time or substantially real-time computations of three-dimensional bounding boxes).

Accordingly, the dimensions of a box enclosing the object 10, including its length and width from the minimum area rectangle are computed in operation 350 and the height is computed in operation 370. In operation 390, the processor outputs the computed dimensions as shown, for example, as dimensions 230 in FIGS. 1B and 1C and as the outline 220 of a bounding box overlaid on a color image view of a scene as shown in FIGS. 1B and 1C. As another example of an output of the dimensions of the computed bounding box, FIG. 4D is a color image of the scene depicted in the depth map of FIG. 4A with a bounding box computed in accordance with embodiments of the present invention overlaid on the view of the bottle.

In some embodiments of the present invention, a volume of a bounding box of an object is estimated from a single view of the object from an RGB-D camera. While this single view is useful and convenient to use in circumstances such as handheld scanning systems, this single view (or other incomplete collections of views) can only represent the portions of the surface of the object that are visible to the depth camera or depth cameras. In such circumstances, in some embodiments of the present invention, some assumptions are made about the invisible or occluded portions of the object when estimating its volume. For example, some embodiments of the present invention assume the shape of the object is approximately symmetric, such that the occluded surface is similar (in reverse) to the visible surface. This is assumption generally holds for objects that are shaped as boxes. In other embodiments of the present invention, no prior assumption on the shape of the invisible or occluded surfaces of the object is made. Instead, an appropriate criterion is used to fit a bounding box to the set of points that are the projection onto the ground plane of visible surfaces. For example, an embodiment of the present invention fits a rectangular bounding box such that the sum of the distances of the points projected onto the ground plane to the closest point in the bounding box is minimized.

While embodiments of the present invention are described herein for application on depth maps obtained from a single view, the same techniques can be applied to data collected from multiple overlapping views, acquired by a single camera capturing multiple depth images over multiple poses with respect to the object or by multiple cameras having different poses with respect to the object (in a single shot or multiple shots). In these cases, techniques such as Iterated Closest Point (ICP) can be used to simultaneously register two or more depth maps and to compute the relative poses (position and orientations) of the cameras with respect to one of the cameras' frames of reference. In some embodiments, the resulting 3-D model (e.g., point cloud and/or a 3-D model including vertices defining polygons specifying surfaces of objects in a scene) is analyzed using substantially similar techniques to compute the volumes of objects.

Box Mode

Some aspects of embodiments of the present invention relate to estimating the volumes of box-shaped or cuboidal objects that have one face laying on the ground in a "box mode." Computing the volume of boxes generally follows a process similar to that described above with respect to "arbitrary" objects, such as the embodiments shown in FIGS. 3 and 5C, with additional modifications based on the assumption of box-shaped objects. In more detail, some embodiments of the present invention exploit geometrical characteristics of box-shaped objects such as the fact that, from any viewpoint of a box, at most three of its faces are visible, at most two of which are vertical. (See, e.g., FIG. 7A, which depicts a color image or photograph of a box, three sides of which are visible.)

Aspects of embodiments of the present invention assume that two vertical faces are visible in the depth map. Note that, due to the slant angle at which the surfaces are seen, it is possible that depth may not be computed successfully everywhere on the surfaces, in particular for points that are farther away.

Figure 6:
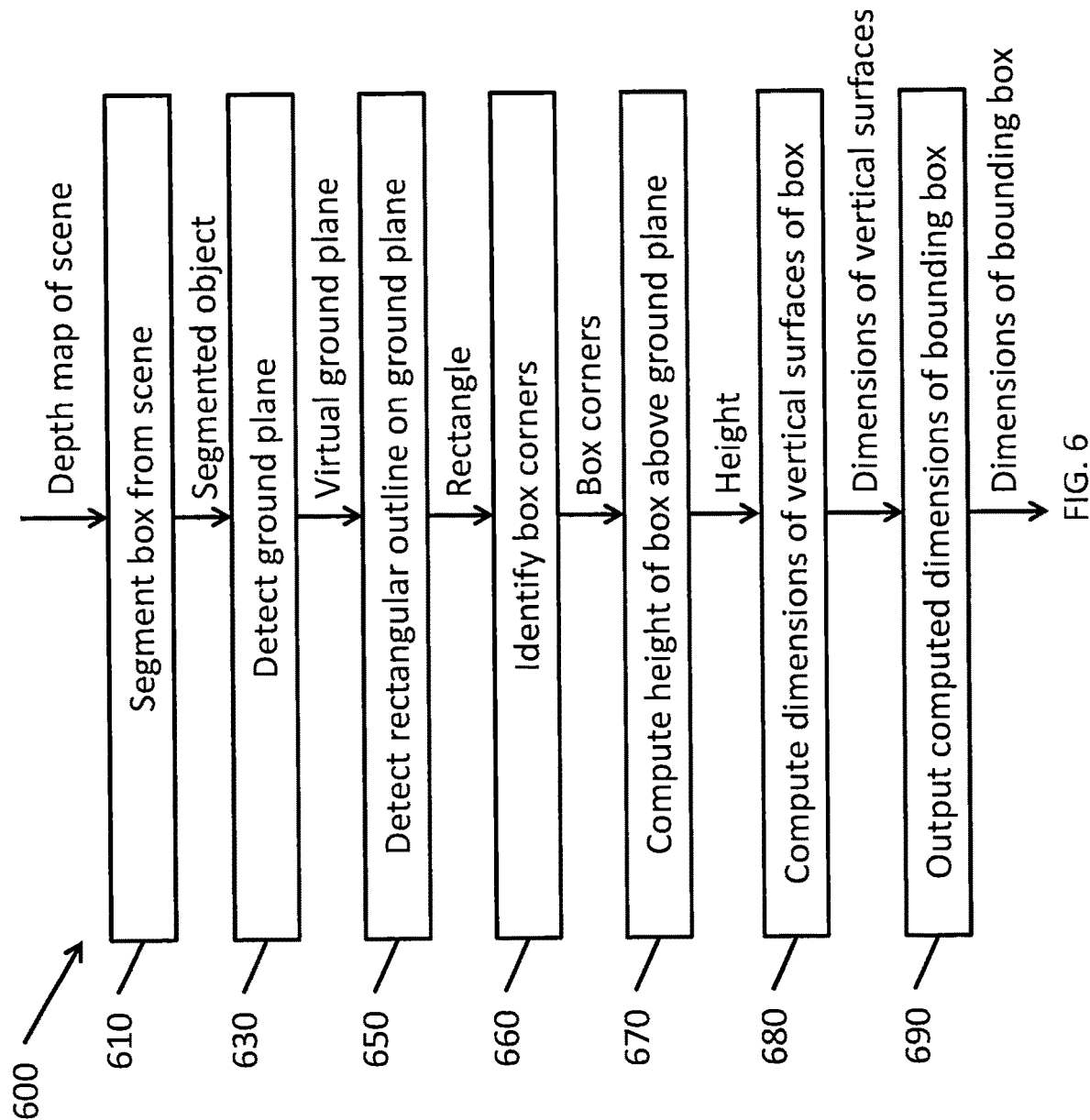
FIG. 6 is a flowchart of a method for measuring dimensions of a box-like object in accordance with one embodiment of the present invention.

FIG. 6 is a flowchart of a method 600 for measuring dimensions of a box-like object in accordance with one embodiment of the present invention. According to some embodiments of the present invention, the general structure of estimating dimensions of a box is similar to that for an arbitrary object. Accordingly, for the sake of clarity, operations that are substantially the same or substantially similar to those described with respect to FIGS. 3 and 5C will not be repeated in detail.

As shown in FIG. 6, in operation 610, the object of interest 10 is segmented from a scene in a received depth map.

Figure 7A:
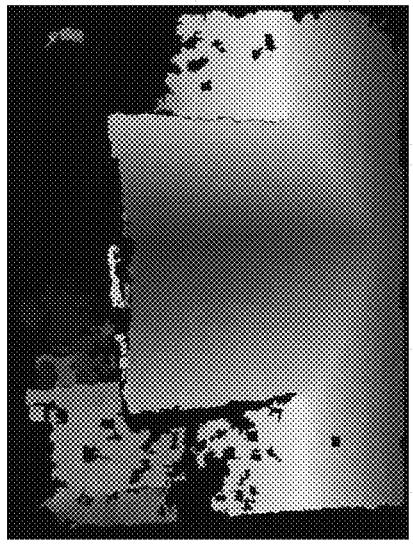
FIG. 7A is a color photograph of a scene containing a box in the foreground and some clutter in the background.
Figure 7B:
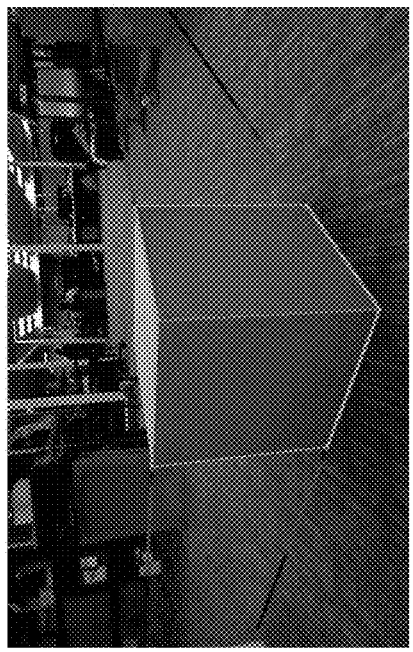
FIG. 7B is a depth map of the scene, where the box in the foreground is shown in red, indicating that it is closer to the depth camera system and with the background clutter in blue, indicating that the clutter is farther from the depth camera system.

FIG. 7A is a color photograph of a scene containing a box in the foreground and some clutter in the background. FIG. 7B is a depth map of the scene, where the box in the foreground is shown in red, indicating that it is closer to the depth camera system 100 and with the background clutter in blue, indicating that the clutter is farther from the depth camera system. The top corner of the box is shown in dark red, indicating that it is the point of the box that is closest to the depth camera system 100. Portions of the top of the box are shown in dark blue in FIG. 7B, indicating failures of the depth reconstruction process in those regions.

In operation 630, the processor detects or computes the visible ground plane in the depth map in a manner similar to that described in operation 330.

Figure 7C:
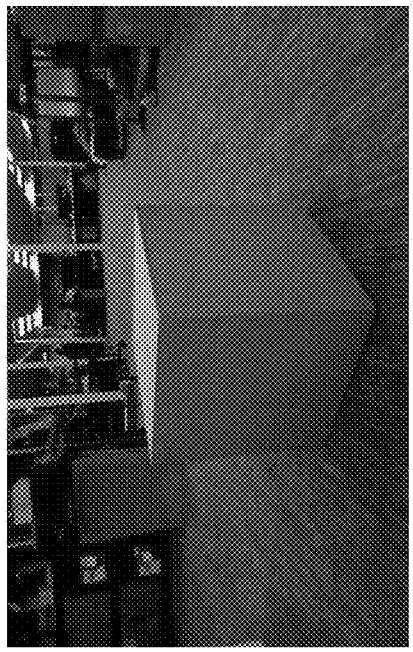
FIG. 7C is an example of the projection of the visible points of the box shown in FIG. 7B onto the ground plane when viewed from "above" (e.g., along the direction of gravity).

In operation 650, the processor projects the visible surface points of the segmented object are vertically projected down to the ground plane ("smashed" onto the ground plane). Ideally, the vertical projection of points from the vertical faces would form two segments at a square angle. Other points (from to the top face, if visible, as well as from other visible surfaces in the scene) will project on the ground plane as well. While the points in the top faces are expected to have sparse density, points from other surfaces (in particular, other vertical box faces) may also look like line segments when projected onto the ground plane. In case other box corners are visible, these additional segments will also form square angles with each other. FIG. 7C is an example of the projection of the visible points of the box shown in FIG. 7B onto the ground plane when viewed from "above" (e.g., along the direction of gravity). As seen in FIG. 7C, the vertical surfaces of the box form two lines arranged at right angles to one another.

In operation 660, the processor identifies segments of points that intersect at square angles, as they are likely to characterize a box corner. In some embodiments of the present invention, this operation is performed using random sample consensus (RANSAC). One embodiment identifies individual lines one by one, where points that support a line ("inliers") are removed before computing the next line. The processor then builds a graph from the lines thus found, where the nodes of the graph represent lines found by RANSAC, and two nodes in the graph are linked by an edge if the lines they represent form an approximately square angle (e.g., approximately 90° angle). Each node i in the graph also stores the number of inliers, I(i) supported by the associated line. Then, the processor finds the two nodes, i and j, connected by an edge, with the highest value of I(i)+I(j).

The two lines found in this way represent the traces of two planes, orthogonal to the ground plane, that contain the two visible vertical faces of the box. These two lines intersect at the trace of the corner joining the two visible vertical faces (e.g., the vertical edge closest to the camera in FIGS. 7A and 7B). Some embodiments only consider the two joined semi-lines, obtained from the original two lines by removing all points that are closer to the camera than the intersection point.

To fully characterize the dimensions of the box, embodiments of the present invention characterize the height of the box and the extents of the two visible vertical faces.

Finding the Box Height

The box height determines the location of the top face of the box, which is parallel to the ground plane. Note that the top face of the box, if it is seen at all, is often seen at a large slant angle, which can make depth computation of the top face less reliable. Furthermore, depending on the viewing angle, only a small portion of the top face may be visible. However, the entirety of the top edges of the two visible vertical faces is visible, and thus the points corresponding to the edges can be used to compute the box's height. Unfortunately, depth measurements at the edges of the top face are generally noisy and unreliable. Accordingly, some aspects of embodiments of the present invention relate to techniques for the processor to compute a robust estimate of the height of a box in operation 670 based on a depth map of a scene.

The process of computing the height of the box in operation 670 generally relates to computing the height of the box at multiple locations along the top edges of the box and applying statistical techniques to determine the most likely actual height of the box.

More specifically, in one embodiment of the present invention, the processor 108 defines a grid in the virtual ground plane, computed in operation 630, that the box rests on. The processor selects only the cells of the grid that contain either of the two semi-lines (e.g., the bright portions of the lines shown in FIG. 7C), representing the traces of the semi-planes containing the visible vertical faces described above. For each such selected cell i of the grid, the processor stores the largest distance $h(i)$ to the virtual ground plane among all measured 3-D points that project orthogonally onto that cell. Note that an individual cell in either semi-line may collect points coming from not only the top edge of the box, but also from different locations on the vertical faces (at different heights in the face). Assuming that cells are large enough, as compared to the density or resolution of the depth map measurements, that at least one point from the top edge projects onto each cell, then for each cell i the recorded maximum value $h(i)$ would represent the value of the box's height, as contributed by that cell (possibly corrupted by a small amount of noise).

In some cases, such as when the grid is much finer compared to the density of the depth map, there some of the cells may fail to include points from the top edges of the box. For those cells that do not contain points from the top edges, the recorded value $h(i)$ will be smaller than the actual height of the box. In some circumstances, this can be overcome by computing the maximum value of all of the $h(i)$ among all cells in the semi-lines (e.g., $\max_i h(i)$).

However, this strategy may fail when points from "spurious" measurements of surfaces (e.g., points from background clutter or another box that is stacked on top of the box under consideration, or from another nearby box on the ground) project onto cells in either semi-line. In some embodiments of the present invention, it is assumed that the majority of cells along the two semi-lines shown in FIG. 7C are expected to contain a value of $h(i)$ that is similar to the actual height of the box. For example, in some embodiments, the processor computes the median or other higher percentile of the values $\{h(i)\}$. In some embodiments of the present invention, the processor computes the mode of the distribution of the values $\{h(i)\}$.

As a more specific example, in some embodiments, the processor computes a histogram of the values $\{h(i)\}$, with equal-size bins uniformly distributed between $\min_i h(i)$ and $\max_i h(i)$. The bin $B_j = [B_{j,min}, B_{j,max}]$ with the maximum associated count is then selected, and the center point $(B_{j,min}+B_{j,max})/2$ of bin $B_j$ is computed as the estimate of the height of the box.

In some embodiments of the present invention, the processor refines the estimation by considering all values of h(i) that fall within $[B_{j,min}, B_{j,max}]$ and by computing a new histogram of these values, with bins defined between $B_{j,min}$ and $B_{j,max}$. This operation can be repeated recursively until a minimum pre-set bin size is reached, or until the variation of the box height estimate between two iterations is below a certain threshold (e.g., until $B_{j,max}-B_{j,min}$ is less than a threshold value).

Once the box height has been found in operation 670, the processor computes, in operation 680, two planar regions, $P_1$ and $P_2$, which are built from two vertical half planes that intersect the ground plane at the semi-lines considered above, and are limited from below by the ground plane, and from above by the plane containing the top face of the box (e.g., the plane parallel to the ground plane and at the height computed in operation 670).

Computing Extents of Vertical Faces

As mentioned earlier, precise depth computation may be difficult or impossible to achieve for points on the object (and in the ground plane) that are farther away from the depth camera system 100, due, for example, to physical and technical limitation of the hardware.

Accordingly, some aspects of embodiments of the present invention relate to reliably computing the location of the outer edges of the vertical faces in operation 680, even when depth data is unreliable.

The processor projects the two vertical planar regions $P_1$ and $P_2$, described above, onto the camera's focal plane using the known intrinsic parameters of the camera, which may be previously computed offline and stored in memory. The projection on the focal plane of planar regions $P_1$ and $P_2$ is defined by one segment (corresponding to the corner where $P_1$ and $P_2$ are joined) and by two pairs of half lines $(l_1^1, l_1^2)$ and $(l_2^1, l_2^2)$, respectively, which are the projections onto the focal plane of the top and of the bottom edges of $P_1$ and $P_2$. A spatially ordered sequence of regularly spaced pixels $\{p_1, p_2, \ldots\}$ is determined on either the top or the bottom half line for $P_1$ (where $p_1$ is the closest pixel to the intersection of the two half lines). For each such pixel $p_1$, the processor computes the vertical plane (orthogonal to the ground plane) that contains both $p_1$ and the optical center of the camera. This plane intersects the camera's focal plane in an image line through $p_1$.

The processor considers the segment of pixels $S_1$ intersected by this line between $l_1^1$ and $l_1^2$; for each such pixel, and determines the measured 3-D surface point projecting onto such a pixel. The processor then checks whether these points are consistent the planar surface $P_1$. More precisely, the processor counts the number $n_{i,1}$ of such points that are within a certain distance d from $P_1$, as well as the number $n_{i,2}$ of points that are further than d from $P_2$. This operation is repeated for pixels $\{p_1, p_2, \ldots\}$. Then, starting from $p_1$, the processor considers the pixels $p_2, p_3, \ldots$ until one such pixel, $p_j$, is found with an associated value $n_{j,1}$ that is lower than a threshold value.

Based on this observation, the processor safely concludes that all points projecting onto the segments $S_1, S_2, \ldots, S_{j-1}$ are consistent with the hypothesis that they belong to the vertical face represented by $P_1$. The processor then continues to visit the pixels $p_{j+1}, p_{j+2}, \ldots$, until one pixel, $p_k$, is found (if any) with associated value $n_{j,2}$ larger than another threshold. If one such pixel is found, the processor safely concludes that all points projecting onto the segments $S_k$, $S_{k+1}, \ldots$ are not consistent with the hypothesis that they belong to the vertical face represented by $P_1$, and therefore do not belong to the surface of the box.

At this point, the processor determines which segment $S_m$, with j<m<k, is the projection of the outer edge of the box's face represented by $P_1$. To this end, the processor considers the color content of the RGB-D frame in the quadrilateral region bounded by $l_1^1$, $l_1^2$, $S_j$, and $S_k$. This is expected to work because the image content can be usually expected to be relatively uniform on the surface of the box, yet different from the content of the background.

For each segment $S_m$ within this region, three histograms of the color values are computed (one histogram per color channel) over an appropriate number of bins. Beginning with the segment $S_j$, each segment $S_m$ is evaluated in turn while moving outward, and the associated color histograms are compared, using a standard histogram distance operator (for example, the sum of the squared differences over bins), with the weighted sum of the color histograms from the previously visited segments $\{S_l, j \leq l < m\}$, where the weight assigned to the histograms for the segment $S_l$ is a decreasing function of the distance m−l.

The processor stores the sum of these histogram distances over the three color channels, $D_m$, for each segment $S_m$. After this operation is completed, the processor finds the index m (with j<m<k) with largest value of associated $D_m$. The segment $S_n$ associated with the largest index n such that $D_n < K \cdot D_m$ is chosen to identify the outer edge of the vertical face represented by $P_1$. The same sequence of operations is repeated for the half plane $P_2$ to compute the outer edge of the vertical face represented by $P_2$.

Figure 7D:
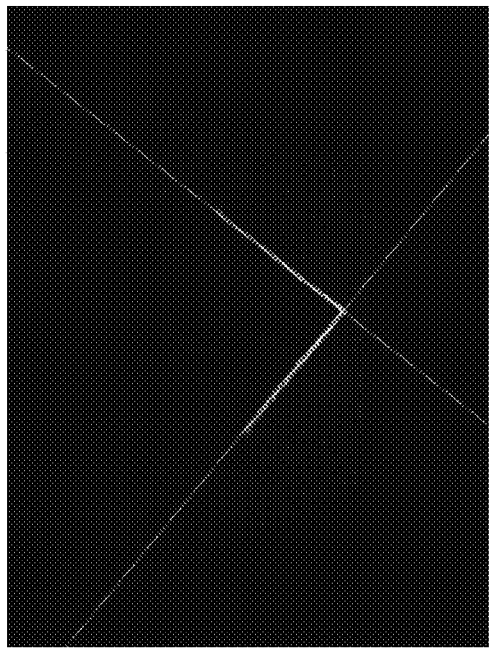
FIG. 7D is a pictorial representation of a method for estimating the vertical surfaces extent according to one embodiment of the present invention.

FIG. 7D is a pictorial representation of a method for estimating the vertical surfaces extent according to one embodiment of the present invention. The green-red-black lines are the vanishing lines obtained by estimating the height of the box and orientation of the vertical sides of the box encoding the compatibility of the vertical edge with the acquired depth (green is compatible, red is not compatible and black is uncertain), the thin green lines extending along the vertical faces of the box are some of the possible candidates for the extent of the vertical sides of the box, and the thick green lines are the estimated extents of the vertical sides of the box.

Figure 8B:
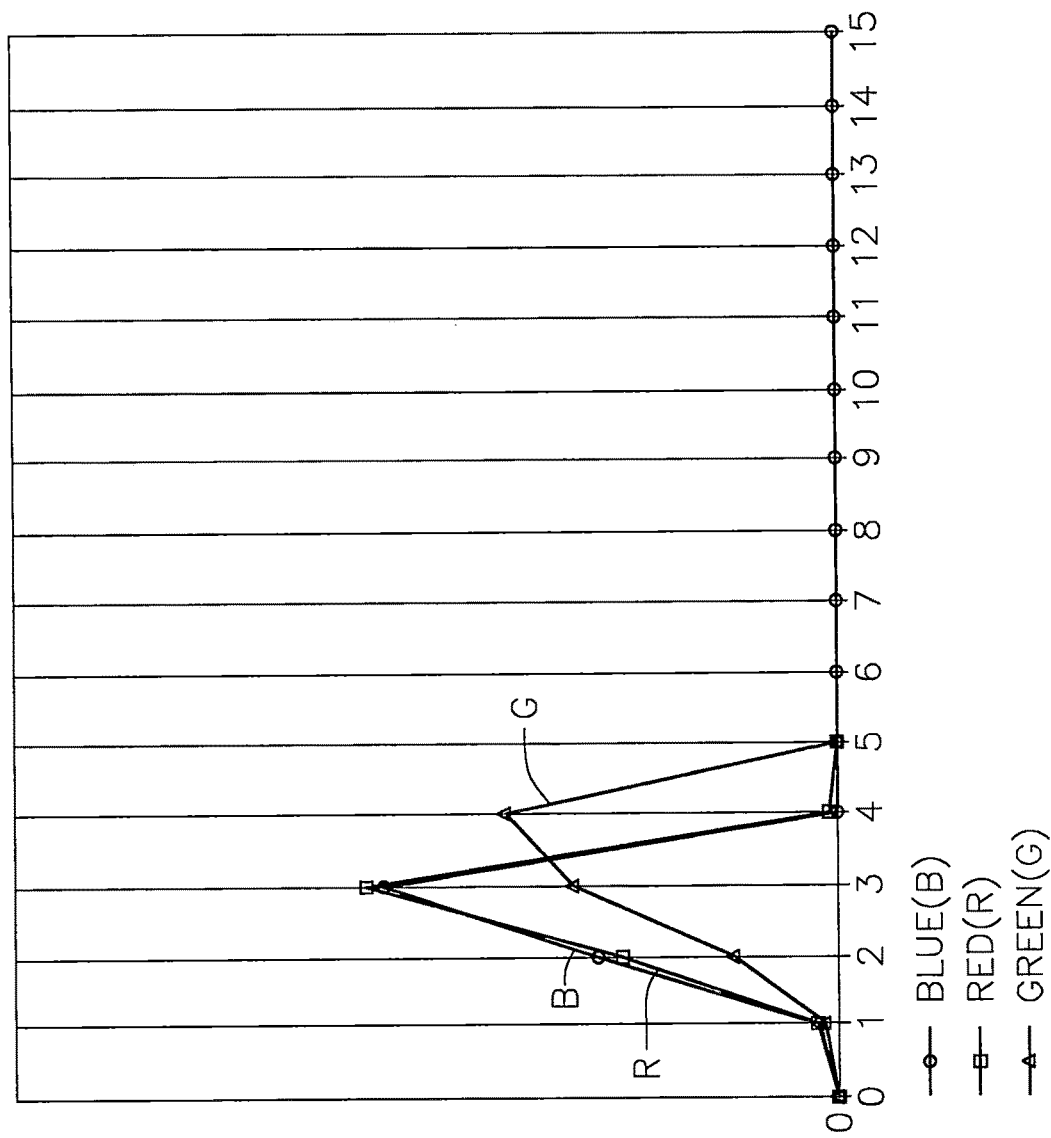

FIGS. 8A, 8B, and 8C are histograms of colors computed from the RGB image for possible candidates of vertical sides extents (thin green lines of FIG. 7D). FIGS. 8A and 8B are reported color histograms for candidates internal to the box and FIG. 8C is a histogram for a candidate external to the box. The extent of the box (vertical thick green lines of FIG. 7D) is estimated in correspondence of a significant histogram variation.

Arbitrary Mode Versus Box Mode

In some embodiments of the present invention, box-mode is activated or deactivated based on a switch or toggle, which may be a physical switch or a software switch in a user interface of the system (e.g., displayed on the display device).

Some aspects of embodiments of the present invention relate to automatically switching between box mode and arbitrary mode based on whether the object is box-like. In particular, if the projection of the points to the ground plane results in a collection of points that is substantially rectangular, and if the points corresponding to the object generally fall along two vertical planes arranged at right angles to the ground plane and at right angles to each other, then the object may be assumed to be box-shaped and the processor may automatically compute the dimensions of the object in "box-mode" as described, for example, above with respect to FIG. 6. On the other hand, if the object is detected as not having a box shape, then the processor may automatically compute the dimensions of the object in an "arbitrary object" mode as described, for example, above with respect to FIG. 3.

Accordingly, aspects of embodiments of the present invention relate to systems and methods for automatically and quickly estimating the dimensions of a box tightly fitting an arbitrary object and/or estimating the dimensions of a box-shaped object.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A system comprising:
   a depth camera system configured to capture color information and depth information of a scene;
   a processor configured to control the depth camera system; and
   a memory storing instructions that, when executed by the processor, cause the processor to:
      control the depth camera system to capture at least a frame of the scene, the frame comprising a color image and a depth image arranged in a plurality of pixels;
      detect an object in the frame;
      determine, based on the frame, a ground plane in the frame, the object resting on the ground plane;
      compute a rectangular outline bounding a projection of a plurality of pixels of the object onto the ground plane;
      compute a height of the object above the ground plane; and
      output computed dimensions of the object in accordance with a length and a width of the rectangular outline and the height,
   wherein the memory further stores instructions that, when executed by the processor, cause the processor to segment the object from the scene by:
      identifying one or more initial pixels of the object; and
      performing an iterative flood fill operation, starting with the initial pixels of the object, each iteration of the flood fill operation comprising adding a plurality of neighboring pixels of the frame to the pixels of the object when distances between the neighboring pixels and the pixels of the object are within a threshold distance
   the system further comprising a display device coupled to the processor,
   wherein the memory further comprises instructions that, when executed by the processer, cause the processor to:
      control the display device to display a view of the color image of the scene captured by the depth camera; and
      overlay a reticle on the view in the display device, and
   wherein the one or more initial pixels of the object correspond to the pixels under the reticle.

2. The system of claim 1, further comprising a trigger, wherein the processor is configured to control the depth camera system to capture the frame in response to detecting an activation of the trigger, and wherein the one or more initial pixels of the object correspond to the pixels under the reticle when the trigger is activated.

3. The system of claim 1, further comprising an inertial measurement unit rigidly connected to the depth camera system and configured to detect an orientation of the depth camera system,
   wherein the memory further comprises instructions that, when executed by the processer, cause the processor to determine the ground plane by:
      identifying, when capturing the frame, an orientation of the depth camera system based on data from the inertial measurement unit;
      identifying a plurality of bottom pixels of the frame based on the orientation;
      computing a partial plane from the bottom pixels of the frame; and
      extending the partial plane in the depth image to define the ground plane.

4. The system of claim 3, wherein a width of a strip of the bottom pixels is calculated in accordance with noise characteristics of the depth camera system.

5. The system of claim 1, wherein the memory further stores instructions that, when executed by the processor, cause the processor to further determine the computed dimensions in accordance with a box mode, the object comprising two vertical faces, the instructions corresponding to the box mode comprising instructions that, when executed by the processor, cause the processor to:
   identify a corner of the object, wherein the corner of the object is located at an intersection of two lines formed in the projection of the pixels of the vertical faces of the object onto the ground plane;
   compute the height of the object above the ground plane by computing heights of top edges of the two vertical faces; and
   compute dimensions of vertical planes of the object.

6. The system of claim 5, wherein the memory further stores instructions that, when executed by the processor, cause the processor to compute the heights of the top edges of the two vertical faces by:
   dividing the ground plane into a plurality of cells;
   selecting a plurality of cells comprising the lines;
   computing a maximum height of each cell based on the pixels of the object in each of the cells; and
   computing a height of the box based on the maximum heights of the cells.

7. The system of claim 5, wherein the memory further stores instructions that, when executed by the processor, cause the processor to activate or deactivate the box mode based on a user interface switch.

8. The system of claim 5, wherein the memory further stores instructions that, when executed by the processor, cause the processor to activate the box mode in response to detecting that the object comprises two vertical planes arranged at right angles to the ground plane and at right angles to each other.

9. The system of claim 1, wherein the depth camera system comprises:
   a color camera;
   a plurality of infrared cameras; and
   an infrared illuminator configured to emit light in a wavelength interval that is detectable by the plurality of infrared cameras.

10. The system of claim 9, wherein the memory stores instructions that, when executed by the processor, cause the processor to capture the frame of the scene by:

controlling the color camera and the plurality of infrared cameras to concurrently capture images while controlling the infrared illuminator to emit light;

computing a disparity map from the images captured by the infrared cameras;

calculating the depth image of the frame from the disparity map; and mapping the image captured by the color camera onto the disparity map as the color image of the frame, wherein the images are captured from the same pose with respect to the scene.

11. The system of claim 9, wherein the color camera, the infrared cameras, and the infrared illuminator are fixed on a stationary frame, and wherein the color camera and the infrared cameras have fields of view directed a scale.

12. The system of claim 9, wherein the color camera, the infrared cameras, and the infrared illuminator are mounted on a handheld scanning device.

13. The system of claim 1, wherein the computed dimensions of the object correspond to dimensions of a box tightly fitting the object.

14. A method for computing dimensions of an object in a scene, the method comprising:

controlling, by a processor, a depth camera system to capture at least a frame of the scene, the frame comprising a color image and a depth image arranged in a plurality of pixels;

detecting, by the processor, an object in the frame;

determining, by the processor and based on the frame, a ground plane in the frame, the object resting on the ground plane;

computing, by the processor, a rectangular outline bounding a projection of a plurality of pixels of the object onto the ground plane;

computing, by the processor, a height of the object above the ground plane; and outputting, by the processor, computed dimensions of the object in accordance with a length and a width of the rectangular outline and the height, the method further comprising segmenting the object from the scene by:

defining a graph, wherein each vertex of the graph corresponds to a vertical projection of the pixels of the scene onto the ground plane and wherein two vertices are connected by an edge if their distance is smaller than threshold;

detecting connected components of the vertical projection of the pixels; and identifying the largest connected component of the graph as the pixels of the object.

15. The method of claim 14, further comprising displaying the computed dimensions on a display device coupled to the processor.

16. The method of claim 14, further comprising determining the ground plane by:

identifying, when capturing the frame, an orientation of the depth camera system based on data from an inertial measurement unit rigidly connected to the depth camera system;

identifying a plurality of bottom pixels of the frame based on the orientation;

computing a partial plane from the bottom pixels of the frame; and extending the partial plane in the depth image to define the ground plane.

17. The method of claim 16, wherein a width of a strip of the bottom pixels is calculated in accordance with noise characteristics of the depth camera system.

18. A method for computing dimensions of an object in a scene, the method comprising:

controlling, by a processor, a depth camera system to capture at least a frame of the scene, the frame comprising a color image and a depth image arranged in a plurality of pixels;

detecting, by the processor, an object in the frame;

determining, by the processor and based on the frame, a ground plane in the frame, the object resting on the ground plane;

computing, by the processor, a rectangular outline bounding a projection of a plurality of pixels of the object onto the ground plane;

computing, by the processor, a height of the object above the ground plane; and outputting, by the processor, computed dimensions of the object in accordance with a length and a width of the rectangular outline and the height, the method further comprising determining the computed dimensions in accordance with a box mode, the object comprising two vertical faces, by:

identifying a corner of the object, wherein the corner of the object is located at an intersection of two lines formed in the projection of the pixels of the vertical faces of the object onto the ground plane;

computing the height of the object above the ground plane by computing heights of top edges of the two vertical faces; and computing dimensions of vertical planes of the object.

19. The method of claim 18, further comprising computing the heights of the top edges of the two vertical faces by:

dividing the ground plane into a plurality of cells;

selecting a plurality of cells comprising the lines;

computing a maximum height of each cell based on the pixels of the object in each of the cells; and computing a height of the box based on the maximum heights of the cells.

20. The method of claim 18, further comprising activating or deactivating the box mode based on a user interface switch.

21. The method of claim 18, further comprising activating the box mode in response to detecting that the object comprises two vertical planes arranged at right angles to the ground plane and at right angles to each other.

22. The method of claim 14, wherein the depth camera system comprises:

a color camera;

a plurality of infrared cameras; and an infrared illuminator configured to emit light in a wavelength interval that is detectable by the plurality of infrared cameras.

23. The method of claim 22, further comprising:

controlling the color camera and the plurality of infrared cameras to concurrently capture images while controlling the infrared illuminator to emit light;

computing a disparity map from the images captured by the infrared cameras;

calculating the depth image of the frame from the disparity map; and mapping the image captured by the color camera onto the disparity map as the color image of the frame, wherein the images are captured from the same pose with respect to the scene.

24. The method of claim 22, wherein the color camera, the infrared cameras, and the infrared illuminator are fixed on a stationary frame, and
wherein the color camera and the infrared cameras have fields of view directed a scale.

25. The method of claim 22, wherein the color camera, the infrared cameras, and the infrared illuminator are mounted on a handheld scanning device.

26. The method of claim 14, wherein the computed dimensions of the object correspond to dimensions of a box tightly fitting the object.

* * * * *